(12) United States Patent
Kai et al.

(10) Patent No.: US 8,228,558 B2
(45) Date of Patent: Jul. 24, 2012

(54) PRINTED MATTER MANAGING SYSTEM

(75) Inventors: Satoshi Kai, Yokohama (JP); Masato Arai, Yokohama (JP); Kenichi Tsuchida, Tokyo (JP)

(73) Assignee: Hitachi INS Software, Ltd., Yokohama (JP)

( * ) Notice: Subject to any disclaimer, the term of this patent is extended or adjusted under 35 U.S.C. 154(b) by 437 days.

(21) Appl. No.: 12/476,775

(22) Filed: Jun. 2, 2009

(65) Prior Publication Data

US 2009/0310160 A1   Dec. 17, 2009

(30) Foreign Application Priority Data

Jun. 5, 2008 (JP) ................................. 2008-148253
Feb. 26, 2009 (JP) ................................. 2009-044235

(51) Int. Cl.
*G06F 15/00* (2006.01)
*H04N 1/40* (2006.01)
(52) U.S. Cl. ........................... 358/1.9; 358/3.28; 358/2.1
(58) Field of Classification Search ........................ None
See application file for complete search history.

(56) References Cited

U.S. PATENT DOCUMENTS

| 7,949,191 | B1 * | 5/2011 | Ramkumar et al. .......... 382/209 |
| 2005/0012613 | A1 * | 1/2005 | Eckstein et al. .......... 340/539.13 |
| 2005/0087604 | A1 * | 4/2005 | Nguyen et al. ................. 235/487 |
| 2006/0028689 | A1 * | 2/2006 | Perry et al. .................... 358/3.28 |
| 2007/0297014 | A1 * | 12/2007 | Kuga et al. .................... 358/3.28 |

FOREIGN PATENT DOCUMENTS

| JP | 2003-241956 | 8/2003 |
| JP | 2007-094620 | 4/2007 |
| JP | 2007-293673 | 11/2007 |
| WO | WO 2006/137057 A2 | 12/2006 |

* cited by examiner

*Primary Examiner* — Twyler Haskins
*Assistant Examiner* — Barbara Reinier
(74) *Attorney, Agent, or Firm* — Foley & Lardner LLP

(57) ABSTRACT

One embodiment provides a printed matter managing system configured to print a file to which a label in accordance with identifying information of the file is applied and to manage the printed file as a printed matter, comprising: a detection unit configured to detect the label applied to the printed matter in one of reading the printed matter by a computer configured to limit one of using a result from the reading of the printed matter by the computer and physically carrying out the printed matter and the identifying information contained in the detected label.

13 Claims, 23 Drawing Sheets

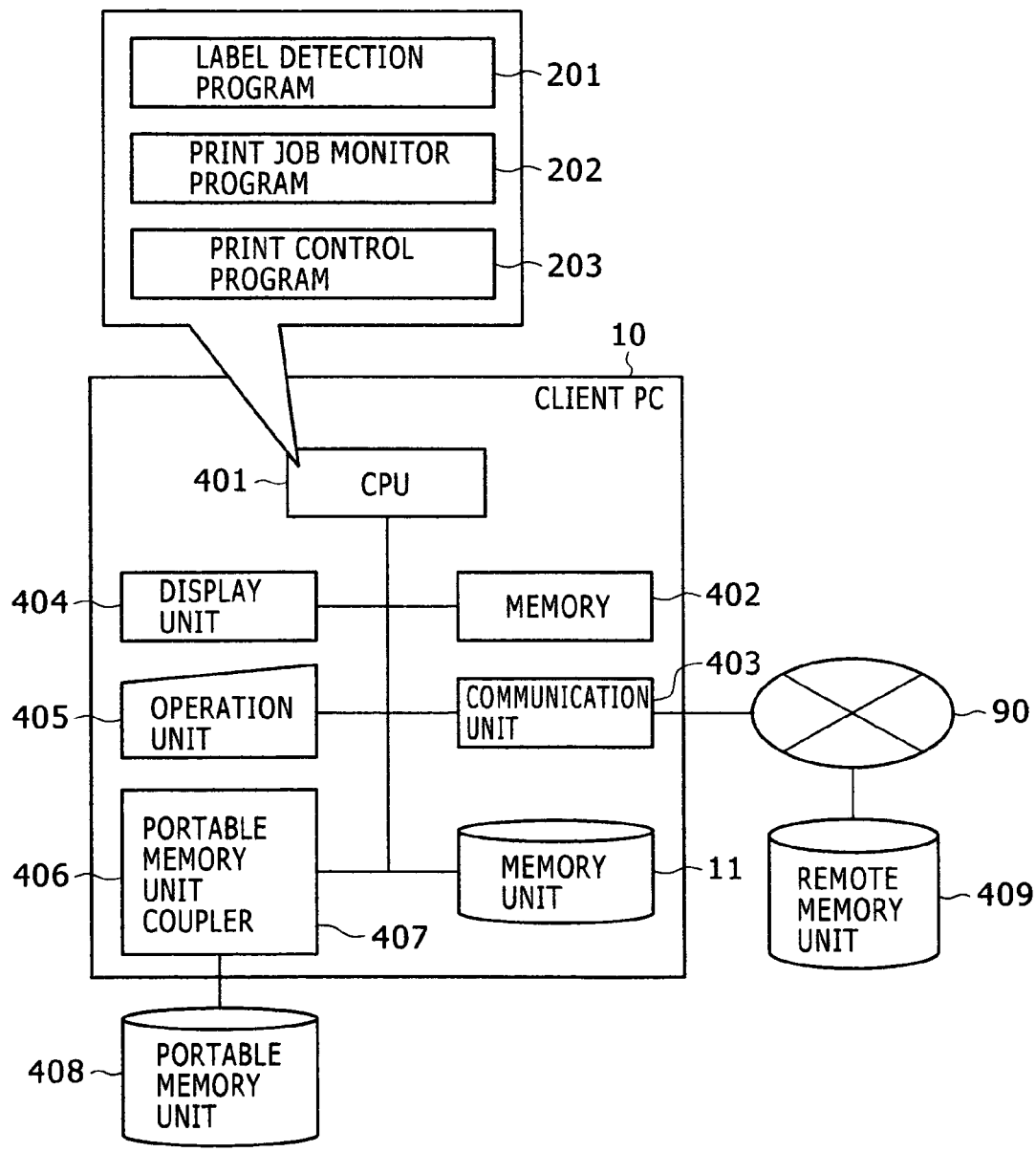

FIG. 5A

LABEL MANAGEMENT TABLE — 501

| LABEL | CONFIDENTIAL LEVEL | CATEGORY |
|---|---|---|
| '08 FINANCIAL INFORMATION | TOP SECRET | SALES |
| PRODUCT INFORMATION | FOR INTERNAL USE ONLY | DESIGN |
| CUSTOMER INFORMATION | FOR INTERNAL USE ONLY | PERSONAL INFORMATION |
| ... | ... | ... |

FIG. 5B

POLICY MANAGEMENT MATRIX — 502

| LABEL | PRINT | COPY | FAX TRANSMISSION | SCAN | LEAVE |
|---|---|---|---|---|---|
| '08 FINANCIAL INFORMATION | x | x | x | x | x |
| xx PRODUCT INFORMATION | Printer1 | Copy1 Design | Fax1 | Scan1 Design | x |
| CUSTOMER INFORMATION | Printer2 Financial | x | Fax2 COMPANY A, COMPANY B | x | Gate2 Financial |
| ... | ... | ... | ... | ... | ... |
| UNSET | x | x | x | x | x | x DENOTES INHIBITION

FIG. 5C

POLICY OPTION MANAGEMENT MATRIX — 503

| LABEL | AVAILABLE TIME ZOON | DISCLOSURE DATE/TIME | STORAGE LIMITATION |
|---|---|---|---|
| '08 FINANCIAL INFORMATION | 9:00-17:00 | NONE | NONE |
| xx PRODUCT INFORMATION | 9:00-17:00 | 2008/7/1 | 2009/3/31 |
| CUSTOMER INFORMATION | ALL DAY | NONE | NONE |
| ... | ... | ... | ... |
| UNSET | ALL DAY | NONE | NONE |

FIG. 5D

PRINTER MANAGEMENT TABLE — 510

| PRINTER NAME | LOCATION | EMBEDDING VISIBLE INFORMATION | EMBEDDING INVISIBLE INFORMATION | PRINT SHEET |
|---|---|---|---|---|
| Printer1 | ROOM ON 2ND FLOOR | PRINTED DATE/TIME, PRINTER USER NAME | LABEL | NORMAL |
| Printer2 | ROOM ON 3RD FLOOR | LABEL | LABEL | RFID TAGGED SHEET |
| ... | ... | ... | ... | ... |

POLICY FILE ~231

FIG.6A  520
COPY MACHINE MANAGEMENT TABLE

| COPY MACHINE NAME | LOCATION | PRINT SHEET |
|---|---|---|
| Copy1 | ROOM ON 2ND FLOOR | NORMAL |
| Copy2 | ROOM ON 3RD FLOOR | RFID TAGGED SHEET |
| ... | ... | ... |

FIG.6B  521
FAX MACHINE MANAGEMENT TABLE

| FAX MACHINE NAME | LOCATION |
|---|---|
| Fax1 | ROOM ON 2ND FLOOR |
| Fax2 | ROOM ON 3RD FLOOR |
| ... | ... |

FIG.6C  522
SCANNER MANAGEMENT TABLE

| SCANNER NAME | LOCATION |
|---|---|
| Scan1 | ROOM ON 2ND FLOOR |
| Scan2 | ROOM ON 3RD FLOOR |
| ... | ... |

FIG.6D  523
GATE MANAGEMENT TABLE

| GATE NAME | LOCATION |
|---|---|
| Gate1 | ROOM ON 2ND FLOOR |
| Gate2 | ROOM ON 3RD FLOOR |
| ... | ... |

FIG.6E  530
USER MANAGEMENT TABLE

| USER ID | USER NAME | GROUP |
|---|---|---|
| 001 | Suzuki | Financial |
| 002 | Takahashi | Design |
| ... | ... | ... |

FIG.6F  531
CUSTOMER MANAGEMENT TABLE

| CUSTOMER NAME | FAX NUMBER |
|---|---|
| COMPANY A | 123-4567 |
| COMPANY B | 234-5678 |
| ... | ... |

FIG.6G
INDEX FILE ~221

| DOCUMENT ID | CREATOR ID | CREATED DATE/TIME | LABEL |
|---|---|---|---|
| D:¥doc¥ESTIMATION.xls | Suzuki | 2008/04/10 10:00 | '08 FINANCIAL INFORMATION |
| D:¥doc¥PLAN.doc | Takahashi | 2008/04/20 11:00 | ×× PRODUCT INFORMATION |
| ... | ... | ... | ... |

FIG. 7A  PRINT LOG FILE — 204

| PRINTED RESULT | PRINTED DATE/TIME | PRINTER USER ID | PRINTER NAME | FILE NAME | PRINTED IMAGE | PRINT SOURCE LABEL | PRINT SHEET ID |
|---|---|---|---|---|---|---|---|
| PERMITTED | 2008/04/21 13:00 | 001 | Printer1 | ESTIMATION.doc | 1ST IMAGE | '08 FINANCIAL INFORMATION | 0x1234 |
| ... | ... | ... | ... | ... | ... | ... | ... |

FIG. 7B  COPY LOG FILE — 304

| COPIED RESULT | COPIED DATE/TIME | COPY USER ID | COPY MACHINE NAME | COPY IMAGE | COPY SOURCE LABEL | COPY SOURCE SHEET ID | COPY SHEET ID |
|---|---|---|---|---|---|---|---|
| PERMITTED | 2008/04/21 13:00 | 001 | Copy1 | 1ST IMAGE | '08 FINANTIAL INFORMATION | 0x1234 | 0x5678 |
| ... | ... | ... | ... | ... | ... | ... | ... |

FIG. 7C  FAX TRANSMISSION LOG FILE — 314

| FAX TRANSMISSION RESULT | TRANS- MISSION DATE/TIME | TRANSMITTER ID | FAX MACHINE NAME | FAX NUMBER | TRANS- MITTER IMAGE | TRANSMITTER LABEL | TRANS- MITTER SHEET ID |
|---|---|---|---|---|---|---|---|
| PERMITTED | 2008/04/21 13:00 | 001 | Fax1 | 123-4567 | 1ST IMAGE | '08 FINANCIAL INFORMATION | 0x1234 |
| ... | ... | ... | ... | ... | ... | ... | ... |

FIG. 7D  SCAN LOG FILE — 324

| SCAN RESULT | SCAN DATE/TIME | SCAN USER ID | SCANNER NAME | SCAN IMAGE | SCAN SOURCE LABEL | SCAN SOURCE SHEET ID |
|---|---|---|---|---|---|---|
| PERMITTED | 2008/04/21 13:00 | 001 | Scan1 | 1ST IMAGE | '08 FINANCIAL INFORMATION | 0x1234 |
| ... | ... | ... | ... | ... | ... | ... |

FIG. 7E  LEAVE LOG FILE — 334

| LEAVE RESULT | LEAVE DATE/TIME | LEAVING USER ID | GATE NAME | CARRIED SHEET ID | CARRIED SHEET LABEL |
|---|---|---|---|---|---|
| ALERTED | 2008/04/21 13:00 | 001 | Scan1 | 0x1234 | '08 FINANCIAL INFORMATION |
| ... | ... | ... | ... | ... | ... |

FIG. 9

| | | | |
|---|---|---|---|
| 750 → | LABEL REGISTRATION PROGRAM | | |

(STEP 1) DRAG & DROP FILE.

(STEP 2) SELECT FILE.                    753

| | FILE PASS | FILE NAME | EXISTING LABEL |
|---|---|---|---|
| 751 → | | | |
| 752 → | C:¥doc¥ | FY08_A DIVISION.xls | UNSET |
| | C:¥doc¥ | FY08_B DIVISION.xls | UNSET |
| | | | |

(STEP 3) SELECT LABEL.

▼—754

755 — REGISTER        CANCEL —756

FIG.17

1701 LAST NAME
佐藤
鈴木
高橋
田中
伊藤
...

1702 FIRST NAME_MALE
大翔
蓮
大輝
翔太
悠斗
...

1703 FIRST NAME_FEMALE
葵
さくら
優奈
結衣
陽菜
...

1704 PLACE NAME
北海道
青森
岩手
宮城
秋田
...

1705 CONTRACT DOCUMENT
甲
乙
丙
...

1706 FINANCIAL STATEMENT
賃借対照表
負債
資本
損益計算書
純利益
キャッシュフロー
...

1707 ORGANIZATION NAME
XYZ 銀行
AB鎌倉銀行
室町QR銀行
...

1708 C LANGUAGE
while
break
switch
case
default
...

1709 JAVA LANGUAGE
package
import
class
interface
extends
...

1710 ZIP CODE
060-00{00-63}
064-08{01-26}
064-09{12-59}
...

1711 PHONE NUMBER
011-{0000-9999}
0123-{0000-9999}
0124-{0000-9999}
0125-{0000-9999}
...

1712 MAIL ADDRESS
@aaa.ne.jp
@bbb.ne.jp
@ccc.ne.jp
...

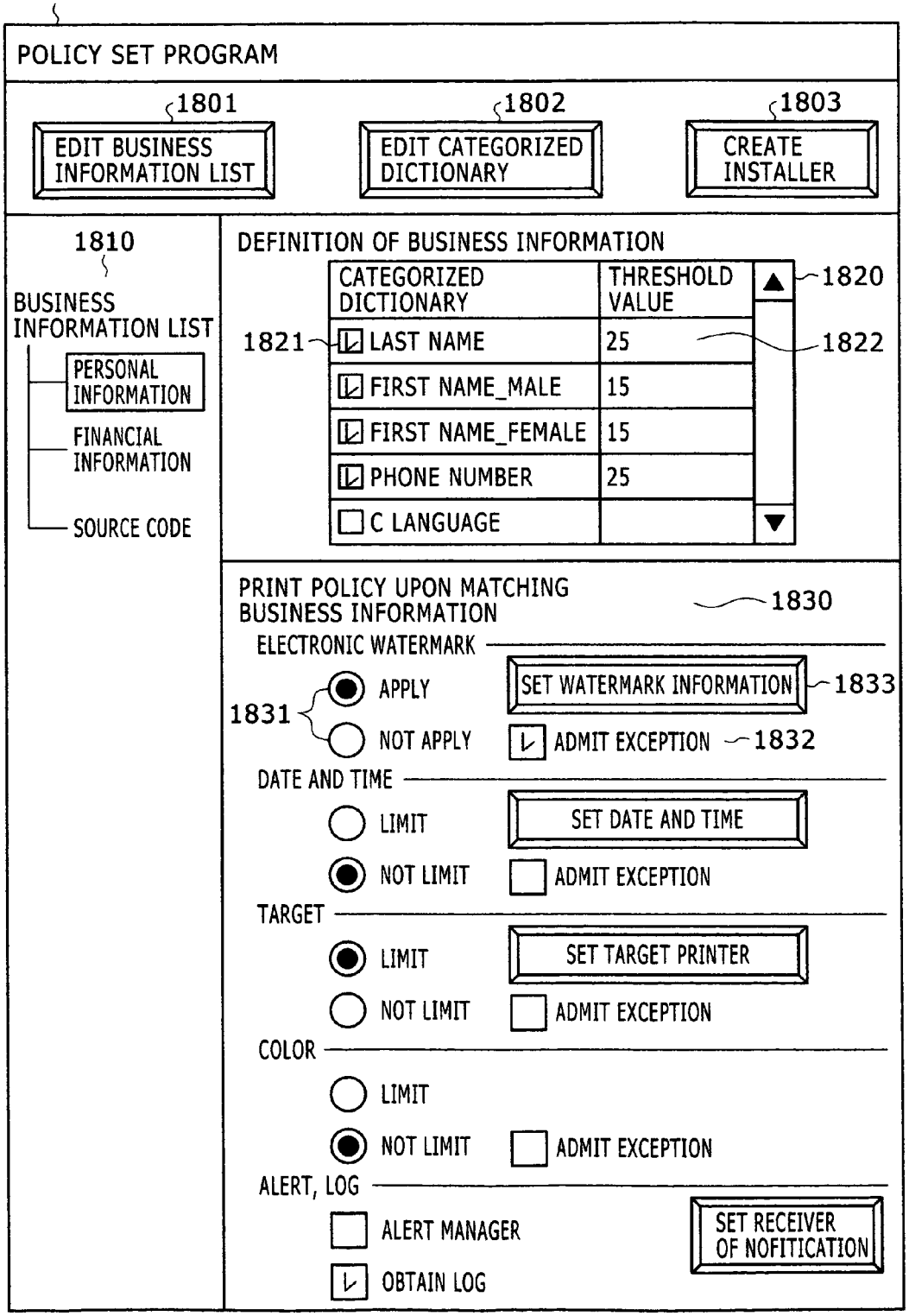

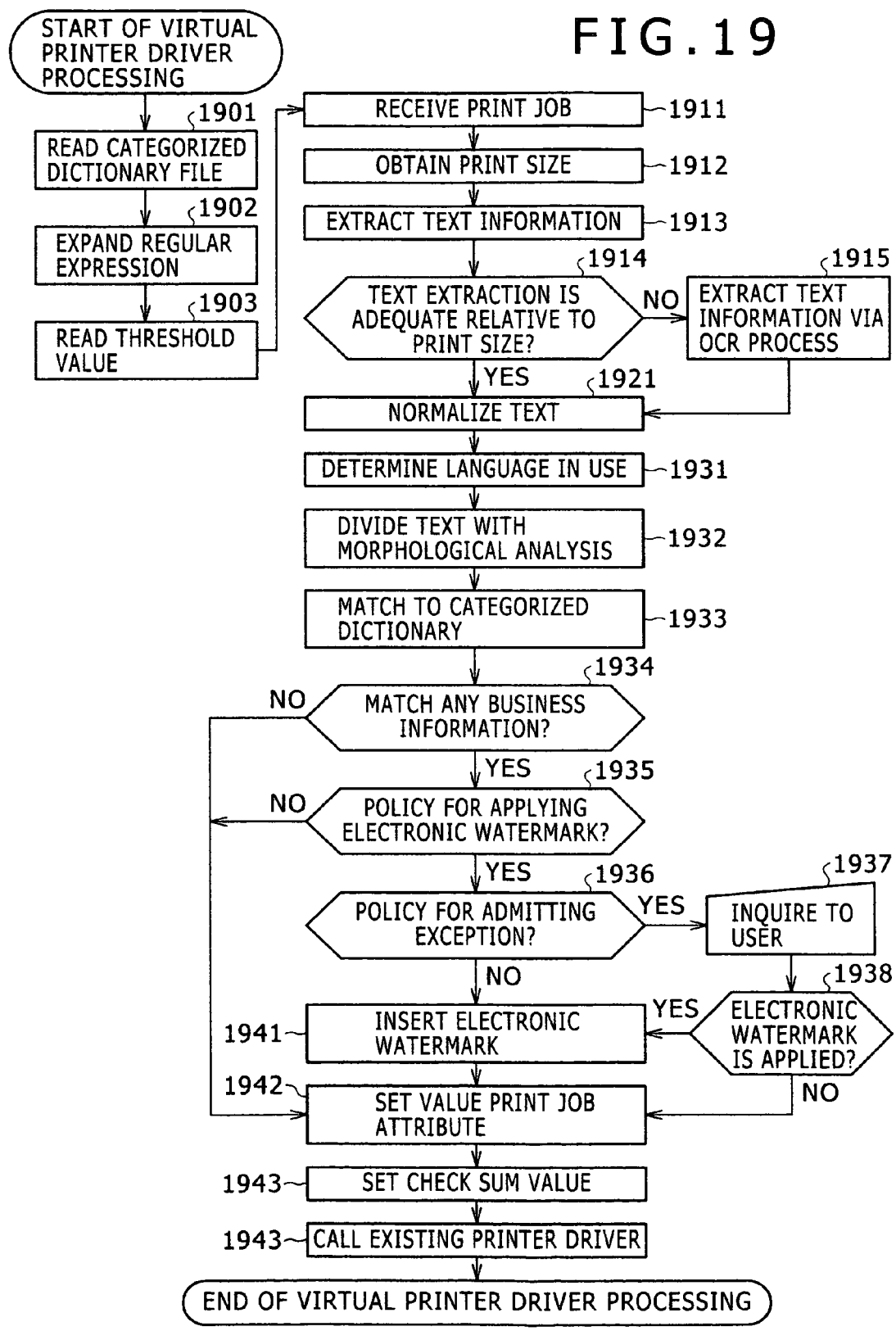

FIG. 20

PRINT IMAGE

2001: 競合他社比較は下記の通りです。

| XYZ銀行 | AB鎌倉銀行 | 室町QR銀行 |
|---|---|---|
| 資本金は○円に対して、純利益は、 | キャッシュフローは、 | まず賃借貸借表によると、 |

⇩ EXTRACT TEXT INFORMATION

TEXT INFORMATION

2002: 競合他社比較は下記の通りです。
XYZ銀行　　AB鎌倉銀行　　室町QR銀行
資本金は○円　キャッシュフ　まず賃借貸借
に対して、　　ローは、　　　表によると、
純利益は、

⇩ FILL BLANK AND SPACE OF LINK BREAK, MORPHOLOGICAL ANALYSIS

2003:

| 競合 | 他社 | 比較 | は | 下記 | の | 通り | です | X | Y | Z | 銀行 |
| A | B | 鎌倉銀行 | 室町 | Q | R | 銀行 | 資本 | 金 | は | ○ | 円 |
| キャッシュフ | まず | 賃借 | 貸借 | に対して | 純 | ロー | は | 表 | に | | |
| よる | と | 利益 | は | | | | | | | | |

⇩ MATCH TO CATEGORIZED DICTIONARY

MATCH TO CATEGORIZED DICTIONARY OF "ORGANIZATION NAME"

2004:

| WARD | FULL MATCH | PARTIAL MATCH | | WORD SCORE |
|---|---|---|---|---|
| | | STRING | SCORE | |
| XYZ銀行 | 0 | X | 1 | 1 |
| | | Y | 1 | |
| | | Z | 1 | |
| | | 銀行 | 2 | |

⇩ COMPARE WITH THRESHOLD VALUE

THE BUSINESS INFORMATION IS REGARDED AS CORRESPONDING TO THE CATEGORIZED DICTIONARY IF TOTAL WORD SCORE IS EQUAL TO OR LARGER THAN THRESHOLD VALUE.

PRINTED MATTER MANAGING SYSTEM

INCORPORATION BY REFERENCE

This application claims priority based on Japanese patent applications, Nos. 2008-148253 filed on Jun. 5, 2008 and 2009-044235 filed on Feb. 26, 2009, the entire contents of which are incorporated herein by reference.

BACKGROUND

The present invention relates to a printed matter managing system for controlling such operations as copy of the printed matter, FAX transmission, scanning of the printed matter into the electronic file, and leave while carrying out the printed matter.

The information leakage is one of the serious risks in the business organization, which may adversely influence the management. Recently, valuable information owned by the organization, for example, personal information, financial information and product design information has been increasingly computerized. As a result, the information leaks through various routes including the off-line carriage-out through the mobile PC and the portable medium, and on-line carriage-out through e-mail. Among those routes, many cases of the information leakage by way of the printed matter have been reported.

The security management of the electronic file may be conducted in accordance with the policy set by the security manager using the file access control and encryption function. In the security management with respect to the printed matter, compliance with the policy set by the security manager is likely to be dependent on the user in most of the case. The printed matter obtained by printing the electronic file may be subjected to various operations, for example, copy by the copy machine (Multifunction Peripheral (MFP)), transmission to the public line via FAX, scanning to the electronic file, and physical carrying out of the printed matter. Generally the management of the aforementioned operations is left to the discretion of the user who has performed the printing. Entrustment of the management to the user has caused wrong transmission owing to the operation error of the user, and further the threat of the intended carrying out as the impulsive conduct. The security manager regards it difficult to confront the threat, and accordingly, the security management with respect to the printed matter independent from discretion of the user is required.

The description in the paragraph 0002 of JP-A No. 2007-293673 discloses limitation of unauthorized use of the printer and the user's printing operation upon installation of the electronic watermarking software on the PC to prevent the printing having no electronic watermarking applied. Specifically, various label information data such as the name of the creator (or the printer user), created date/time (printed date/time), and the copyright display are embedded into the document sheet as the electronic watermark for suppressing leakage of the printed matter.

The description in the paragraphs from 0033 to 0051 of JP-A No. 2007-94620 discloses the art for inserting the watermark into the printed matter forcedly by adding the watermarking information to the printed data by the watermarking print processor irrespective of the intention of the user who performs the printing. Specifically, such information which includes the defined string such as "confidential", log-in ID, domain, date/time, machine name, and IP address as the watermark is embedded to suppress leakage of the printed matter which contains the confidential information.

The description in the paragraphs from 0014 to 0015 of JP-A No. 2003-241956 discloses the art for setting the existence of the watermarking in the folder to which the management level (label information) is assigned for managing the file in the document management system so as to send the watermarking data to the printer driver based on the label set to the folder which contains the file. The watermark data based on the label set in the folder are embedded to suppress the leakage.

SUMMARY

The printed matter output from the printer is expected to contain mixture of various types of information data including a top secret content and a content which may be open to the public. If the printed matter is controlled at the level for the information open to the public, the security for the top secret information becomes insufficient. Meanwhile, if the printed matter is controlled at the level for the top secret information, the security for the one open to the public becomes unnecessarily severe to the information open to the public. It is essential to execute the control adapted to the content of the printed matter.

In JP-A No. 2007-293673, the name of author (operator for printing), documentation date/time (or printed date/time), and the copyright mark are applied to all the printed matters irrespective of the content of the electronic file. JP-A No. 2007-293673 fails to clarify the control method adapted to the content of the printed matter whether it should be handled as the top secret information or the one open to the public.

In JP-A No. 2007-94620, the fixed string, log-in ID, domain, date/time, machine name, and IP address are applied to all the printed matters irrespective of the content of the electronic file. The art disclosed in JP-A No. 2007-94620 fails to clarify the control method adapted to the content of the printed matter whether it should be handled as the top secret information or the one open to the public from the information applied to the printed matter.

In JP-A No. 2003-241956, the management level (label information) set by the document management system may be embedded into the printed matter as the watermark. However, there is no assurance that the same label as the one prior to the printing is applied upon scanning of the printed matter having the label embedded therein. The art disclosed in JP-A No. 2003-241956 fails to execute the control while keeping consistency between the file prior to the printing and the file after the scanning.

The printed matter managing system disclosed herein applies the label corresponding to the content to the printed matter so as to execute the control adapted to the label without leaving the security management of the printed matter to the user.

A disclosed printed matter managing system prints a file to which a label in accordance with identifying information of the file is applied for managing the printed file as a printed matter. The system includes a detection unit for detecting the label applied to the printed matter in one of reading the printed matter by a computer and physically carrying out the printed matter from a predetermined region, and a limiting unit for limiting one of using a result of the reading by the computer and physically carrying out the printed matter in accordance with information contained in the detected label.

In the printed matter managing system as an example, the policy management unit includes a policy management unit for managing a file print policy, a print control unit for controlling the file printing based on a control content to print a label, limit an available printer, limit a type of an available print sheet, print information which relates to the printing, and inhibit the printing in accordance with the identifying information of the file in reference to the policy with respected to the printing managed by the policy management unit, and a log output unit for outputting a control result of the printing to a print log.

In the printed matter managing system, the identifying information contains one of information applied to the file for document management, and information based on a content of the file.

In the printed matter managing system, the print control unit inquires the user about the control content in accordance with the identifying information of the file, and displays a screen which allows the user to input a reason for printing based on the content other than the control content.

In the printed matter managing system, the information based on the content of the file is matched to a predetermined dictionary for extracting the identifying information with respect to full matching and partial matching of a word contained in the content.

In the example, the read result may be copied by printing the read result. The system is provided with the policy management unit for managing the copy policy, a print control unit for printing while embedding the label corresponding to the file identifying information in a predetermined print sheet, a printed matter label detection unit for detecting the label printed on the printed matter, a copy control unit for controlling copy by printing the read result based on any one of limiting the available copy machine, limiting the type of the available copy sheet, and inhibiting the copy in accordance with the information contained in the label detected by the detection unit by referring to the copy policy managed by the policy management unit, and the log output unit for outputting the copy control result to the copy log.

In the example, the read result is scanned to be stored in a memory. The system further includes a policy management unit for managing a scan policy, a scan control unit for controlling the scan of the read result based on any one of limiting an available scanner, applying a label which contains the same information data as that contained in the label to the file as the scan result to be stored in the memory, and inhibiting the scan in accordance with the information contained in the label detected by the detection unit in reference to the scan policy managed by the policy management unit, and a log output unit for outputting a result of the scan control to a scan log.

In the example, the system includes a policy management unit for managing a leave policy with respect to the leave from the predetermined region while physically carrying out the printed matter, a leave control unit for controlling the leave based on one of limiting an available gate which allows the leave and outputting an alert in accordance with information contained in the label detected by the detection unit in reference to the leave policy managed by the policy management unit, and a log output unit for outputting a result of the leave control to a leave log.

In the example, the read result is subjected to a FAX transmission. The system further includes a policy management unit for managing a FAX transmission policy, a FAX transmission control unit for controlling the FAX transmission of the read result based on any one of limiting an available FAX machine, limiting an available addressee of the FAX transmission, and inhibiting the FAX transmission in accordance with information contained in the label detected by the detection unit in reference to the FAX transmission policy managed by the policy management unit, and a log output unit for outputting a result of the FAX transmission control to a FAX transmission log.

In the printed matter managing system, the policy management unit sets the control method with respect to at least one of copy, FAX transmission, scan and leave when the label is unset. When the label cannot be detected by the detection unit, the control may be executed, for example, any one of the copy by the copy control unit in accordance with the policy set by the policy management unit, the FAX transmission by the FAX transmission control unit in accordance with the policy set by the policy management unit, the scan by the scan control unit in accordance with the policy set by the policy management unit, and the leave by the leave control unit in accordance with the policy set by the policy management unit.

The structure of the example is capable of controlling the copy, FAX transmission, scan, and carrying out leave in accordance with the content of the printed matter. Among mixture of the printed matters including the top secret information and the one opened to the public, when the electronic file with the top secret is printed, the control adapted to the top secret is executed with respect to the copy, FAX transmission, scanning and carrying out leave. When the electronic file which can be opened to the public is printed, the control adapted to the level which can be opened to the public is executed with respect to the copy, FAX transmission, scan and carrying out leave. This makes it possible to execute the control in accordance with the content of the information.

The system is applicable to the countermeasure against information leakage in such fields as finance and medical industries and public works which deal with a large number of highly-confidential personal information data, the countermeasure against leakage of technical information in the field which deals with the information with respect to intellectual property, for example, R&D department of pharmaceutical industry, security measure of the outsourcing industry for conducting the business while keeping personal information and business information supplied from the customer enterprise, and the constant security management for the enterprise as the object of the information security audit.

The disclosed printed matter managing system is allowed to execute the control adapted to the content of the printed matter without leaving the security management of the printed matter to the user.

The disclosed printed matter managing system is structured to output the control results to the log to confirm the operation and existence of the printed matter easily from the result of limiting one of using the read result by the computer and physical carrying out of the printed matter.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 4 is a block diagram showing an example of a hardware structure of a client PC;

FIGS. 5A to 5D show an example of a data structure as a part of a policy file;

FIGS. 6A to 6G show an example of a data structure of a part of the policy file and a data structure of an index file;

FIGS. 7A to 7E show an example of the data structure of a log file;

FIG. 9 shows an example of an interface for a label registration program;

FIG. 17 shows an example of a data structure of a classified dictionary file;

FIG. 18 shows an example of an interface of a policy set program;

FIG. 19 is a flowchart showing an operation process of a virtual printer driver;

FIG. 20 is an explanatory view showing an example of a matching process to the classified dictionary;

DETAILED DESCRIPTION OF THE EMBODIMENTS

Figure 1:
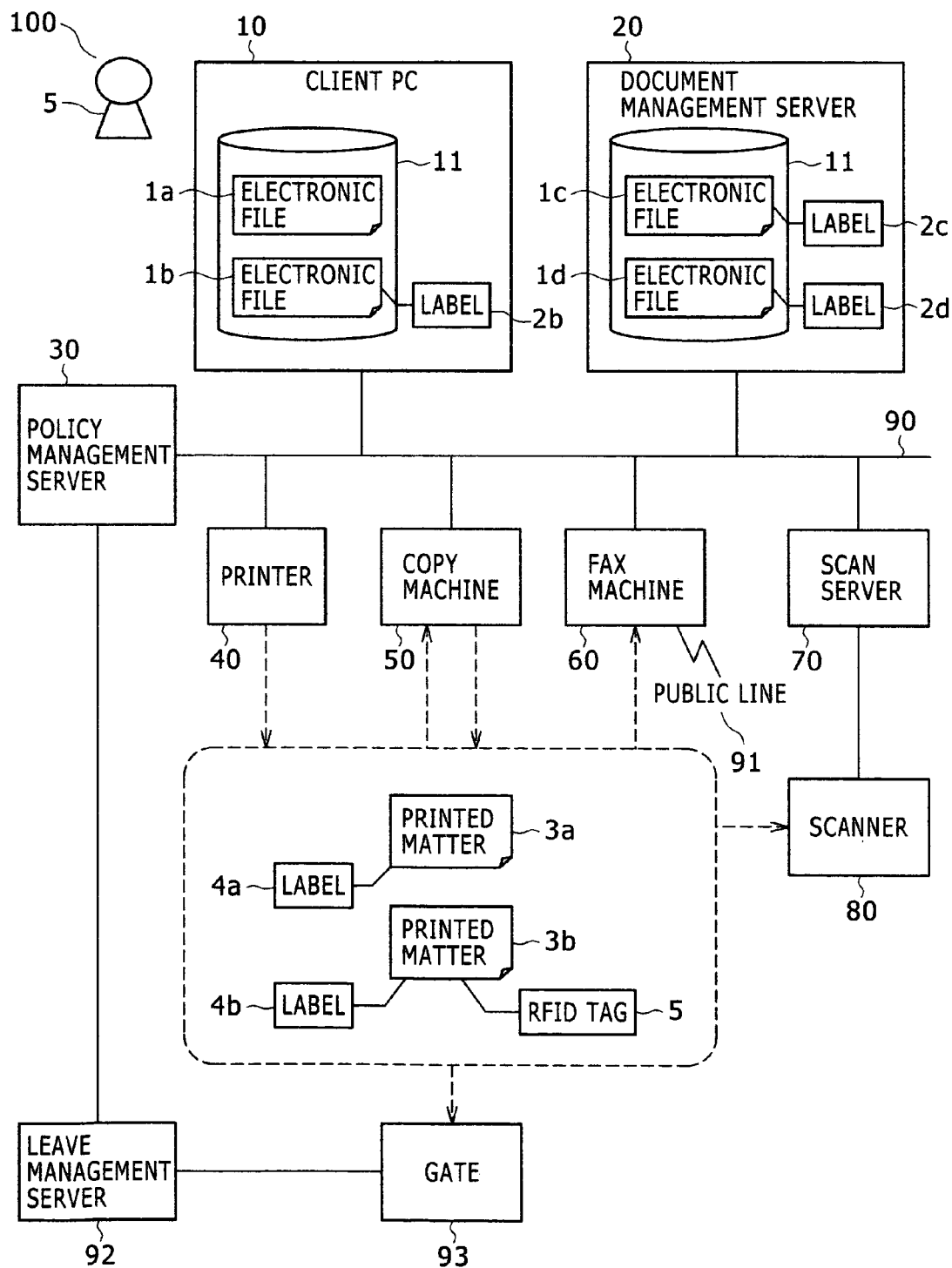
FIG. 1 shows an example of a general structure of a printed matter managing system.

Embodiments will be described referring to the drawings.
First Embodiment

An embodiment will be described referring to the block diagrams shown in FIGS. 1 to 4.

FIG. 1 shows a general structure of a printed matter managing system 100 according to the embodiment. The printed matter managing system 100 includes at least one unit of client PC 10, a document management server 20, a policy management server 30, a printer 40, a copy machine 50, a FAX machine 60, a scan server 70, and a leave management server 92, which are coupled with one another via a network 90.

A user 5 uses the client PC 10 on business so as to perform the task by utilizing electronic files 1a and 1b on a memory unit 11 of the client PC 10, electronic files 1c and 1d on a memory unit 21 of the document management server 20, and printed matters 3a and 3b. The user 5 performs at least one of the following operations as needed by business:

printing the electronic file 1 by the printer 40;
copying the printed matter 3 by the copy machine 50;
FAX transmitting the electronic file 1 or the printed matter 3 to a public line 91 using the FAX machine 60;
reading the printed matter 3 by the scanner 80 so as to be scanned in the scan server 70 as the electronic file; and carrying the printed matter 3 out of the room. The system layout requires the user 5 to pass through a gate 93 every time when the user 5 leaves the room.

A label is always applied to the electronic file on the memory unit 21 of the document management server 20 for the business use. Labels 2c and 2d are applied to the electronic files 1c and 1d, respectively. The label is not necessarily applied to the electronic file on the memory unit 11 of the client PC 10 for the business use. No label is applied to the electronic file 1a, and the label 2b is applied to the electronic file 1b. A label 4a is applied to a printed matter 3a. Likewise, a label 4b is applied to a printed matter 3b. A RFID (Radio Frequency Identification) tag 5 is applied to any one of the printed matters 3. Each of the labels 2 and 4 for the electronic file 1 and the printed matter 3 contains identifying information for identifying the electronic file 1 and the printed matter 3, respectively.

The label 2 applied to the electronic file 1 may be stored in any one of the following locations or any combination thereof:

embedded into an extension file attribute in the file system;
embedded into an i-node region in the file system;
embedded into an alternative data stream in the file system;
directly embedded into the file (header region or entity region); and
embedded as a document attribute in the document file.

The aforementioned labels are succeeded while editing, copying, and moving performed by the client PC 10 and the document management server 20. The label for the electronic file may be succeeded by tracking the file content at the lower level through the file system monitoring and the network monitoring as disclosed in International Publication No. 2006/137057A2.

The label 4 is applied to the printed matter 3 through any one of the following methods or any combination thereof:

embedded into a margin or background of the printed matter as the visual string; and
embedded as a computer readable information such as a two-dimensional bar code and electronic watermark.

Those labels 4 are succeeded during the copy performed by the copy machine 50.

Figure 2:
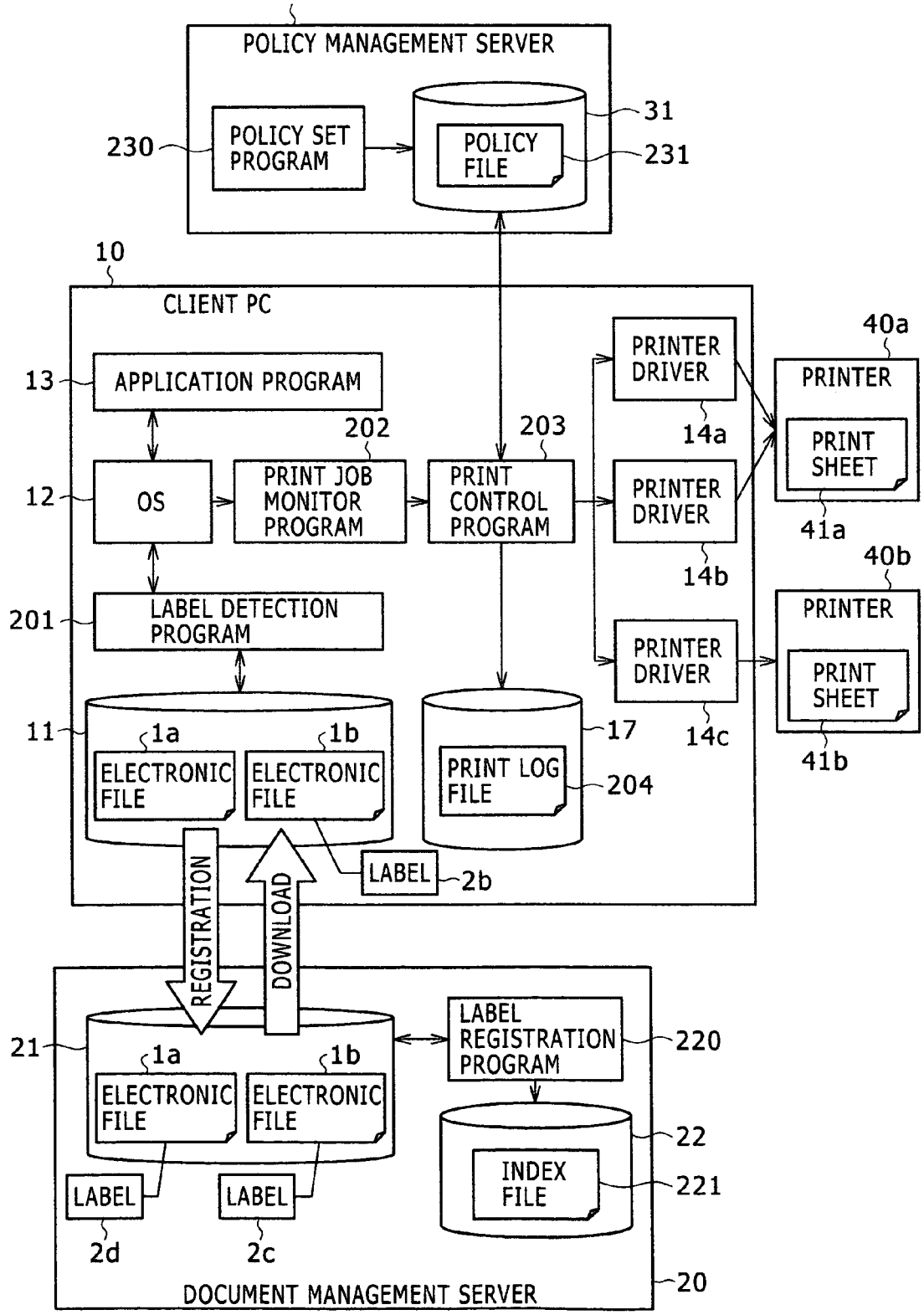
FIG. 2 is a block diagram showing an exemplary system structure of the printed matter managing system.

FIG. 2 shows block structures of the client PC 10, the document management server 20 and the policy management server 30. The client PC 10 includes the memory unit 11, an OS (Operating System) 12, an application program 13 used for the business, at least one printer driver 14 for printing by the printer 40, and a memory unit 17. The client PC 10 further includes a label detection program 201 for detecting the label applied to the electronic file 1, a print job monitor program 202 for monitoring the print request from the application program 13, a print control program 203 for controlling the printing based on the policy file to be described later, and a print log file 204.

The document management server 20 includes memory units 21 and 22. The document management server 20 further includes a label registration program 220 for registering the electronic file 1 and the label 2 corresponding to the electronic file 1 in the document management server 20, and an index file 221 for managing the electronic file 1 and the label 2.

The policy management server 30 includes a memory unit 31, a policy set program 230 and a policy file 231.

The user 5 operates the client PC 10 to allow the label registration program 220 to register the electronic file 1 on the memory unit 11 in the document management server 20, or downloads the electronic file 1 in the memory unit 21 into the client PC 10.

The printer driver 14 and the printer 40 are correlated into the relationship of n to 1 (n≧1). In the example shown in FIG. 2, both the printer drivers 14a and 14b are capable of printing by the printer 40a. For example, the printer driver 14a allows the printer 40a to perform the normal printing, and the printer driver 14b allows the printer 40a to print the background word such as "confidential". The system is designed to allow the printer driver 14a to print on a normal print sheet 41a, and the printer driver 14c to print on a print sheet 41b to which the RFID tag 5 is applied.

The client PC 10 is available for the business by using the electronic file 1 on the memory unit 11 without the label detection program 201, the print job monitor program 202 and the print control program 203. If the printing control program 203 is not provided, the print control corresponding to the policy file 231 is not executed.

Figure 3:
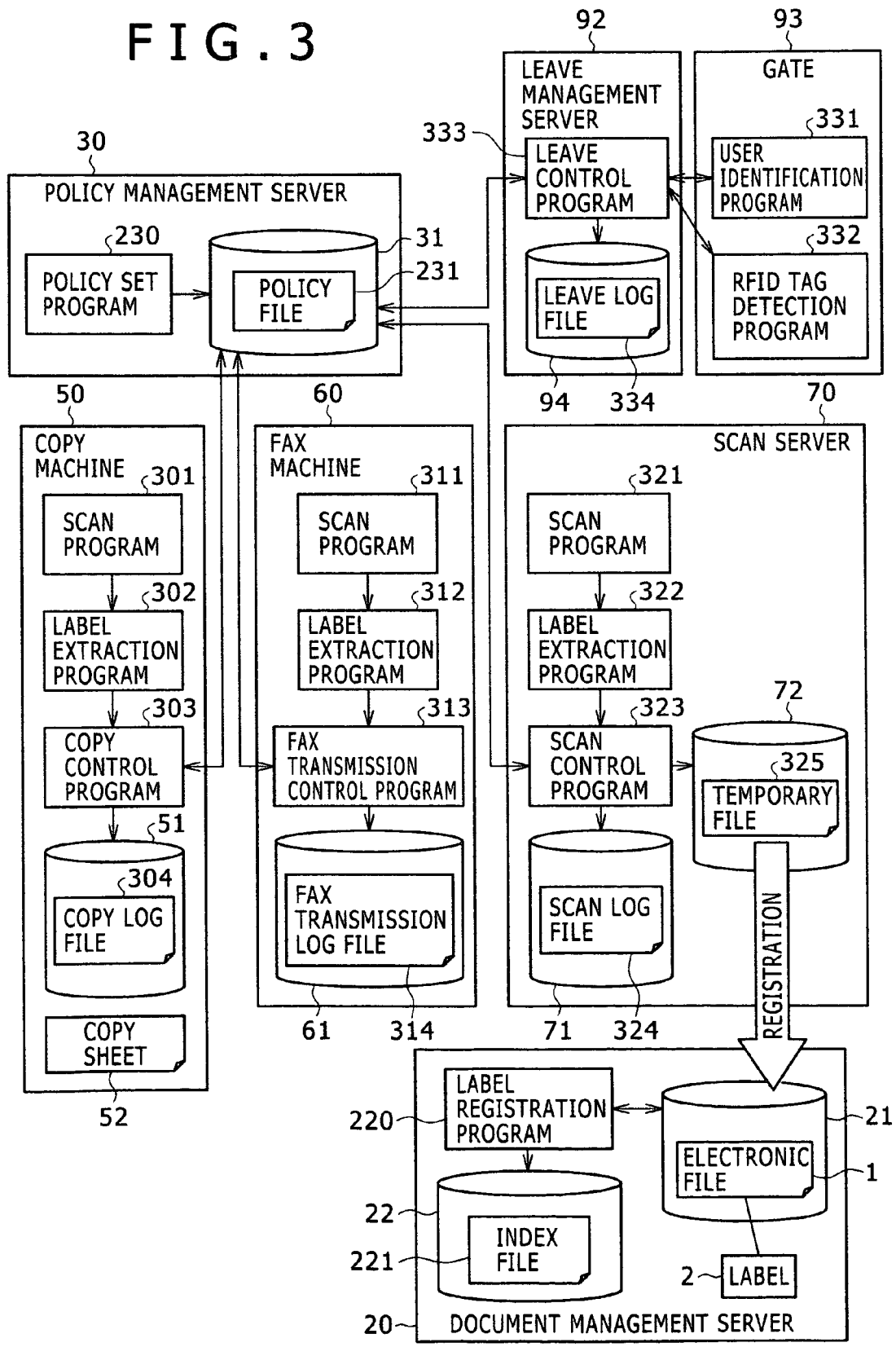
FIG. 3 is a block diagram showing an exemplary system structure of the printed matter managing system.

FIG. 3 shows block diagrams of the copy machine 50, the FAX machine 60, the scan server 70, and the leave management server 92. The copy machine 50 provided with a memory unit 51 reads the printed matter 3 as the image file, and includes a scan program 301 for detecting the RFID tag 5 applied to the printed matter 3, a label extraction program 302 for extracting the label from the image file, a copy control program 303 for controlling the copy based on the policy file 231, a copy log file 304, and a copy sheet 52.

The FAX machine 60 provided with a memory unit 61 includes a scan program 311 which reads the printed matter 3 as the image file and detects the RFID tag 5 applied to the printed matter 3, a label extraction program 312 for extracting the label from the image file, a FAX transmission control program 313 for controlling the FAX transmission based on the policy file 231, and a FAX transmission log file 314.

The scan server 70 provided with memory units 71 and 72 includes a scan program 321 which reads the printed matter 3 as the image file and detects the RFID tag 5 applied to the printed matter 3, a label extraction program 322 for extracting the label from the image file, a scan control program 323 for controlling the scan based on the policy file 231, and a scan log file 324. The scan control program 323 creates a temporary file 325 in the memory unit 72 so as to be registered in the document management server 20 as needed.

The leave management server 92 provided with a memory unit 94 may be communicated with the gate 93. The gate 93 includes a user identification program 331 for identifying the person who passes through the gate 93, and a RFID tag detection program 332 for detecting existence of the RFID tag which passes through the gate 93 and the ID. The leave management server 92 includes a leave control program 333 for controlling the leave based on the policy file 231, and a leave log file 334.

FIG. 4 shows a hardware structure of the client PC 10. The client PC 10 has a hardware structure formed of a CPU (Central Processing Unit) 401 as a central processing unit for controlling the client PC 10 and data calculation/processing, a memory 402 which temporarily stores the data and program in the client PC 10 to allow direct reading/writing of the CPU 401, the memory unit 11 for storing the data and program such as the electronic file 1 even after the power of the client PC 10 is turned off, a communication unit 403 for wired/wireless communication with the network 90, a display unit 404 for displaying the calculation/processing results of the data on the display for the user 5, an operation unit 405 for receiving the keyboard input and mouse input from the user 5, and a portable memory medium coupling unit 406 for reading/writing of the data stored in a portable memory unit 408, which are coupled with one another via bus lines 407.

The memory unit for storing the electronic file 1 may be formed as the memory unit 11, the portable memory unit 408, and a remote memory unit 409 as a NAS (Network Attached Storage) coupled via the network 90.

Each of the document management server 20, the policy management server 30, the printer 40, the copy machine 50, the FAX machine 60, the scan server 70, and the leave management server 92 has the same hardware structure as that of the client PC. The CPU of the aforementioned machines executes the programs stored in the memory units so as to realize the processing and function to be described below. In the explanation of the embodiment, the program of the respective machines will be described as the main structure for executing the aforementioned processing and function.

Each program may be structured to be stored in the data storage unit and the memory of the respective devices. Alternatively, the program may be introduced from the other device as needed via the portable memory unit coupler, communication unit, and the medium which may be used by the respective devices. The medium denotes the removable portable data storage unit or the communication medium (that is, the network or the carrier wave and digital signals for carrying the network).

The data will be described referring to FIGS. 5A to 6G.

FIGS. 5A to 5D show a data structure as a part of the policy file 231. A part of the policy file 231 includes FIG. 5A label management table 501, FIG. 5B policy management matrix 502, FIG. 5C policy option management matrix 503, and FIG. 5D printer management table 510.

The label management table 501 has a table structure which contains 0 or more entries, each of which is formed by combining the label applied to the electronic file and the printed matter, a confidential level corresponding to the label, and the category corresponding to the label.

The policy management matrix 502 has the matrix structure which defines the control method of one of the following groups in accordance with the label of the label list in the label management table 501 and the label which has been unset:

- permission or inhibition of printing, name of the printer permitted for printing, the name of the user or the group permitted for printing, and string to be printed as the background word;

- permission or inhibition of copying, name of the copy machine permitted for copying, and name of the user or the group permitted for copying;

- permission or inhibition of FAX transmission, name of the FAX machine permitted for the FAX transmission, and name of the user or the group permitted for the FAX transmission;

- permission or inhibition of scanning, name of the scanner permitted for the scanning, and name of the user or the group permitted for the scanning; and

- permission or inhibition of leave, and name of the user or the group permitted for leave.

If the information is leaked out of the organization by carrying out through the gate or the FAX transmission to the FAX number outside the organization while having the label unset, it is difficult to promptly evaluate the risk of the leakage as the value of the leaked information is unknown. The control method for the case of the unset label may be set to ensure quick action against the leakage.

The policy option management matrix 503 has a matrix structure, which defines the method for controlling one of the following items in accordance with the label of the label list stored in the label management table 501 and the label which has been unset:

available time zone for allowing the operation;

disclosure date/time set to limit the disclosure therebefore; and storage limitation indicating the date requiring disposal thereafter.

The printer management table 510 has the table structure formed of 0 or more entries, each of which is formed by combining a printer name indicating the printer driver title, a printer location, a method for embedding the printed date/time and the printer user name as visual information, the method for embedding the label as invisible information, and the print sheet.

FIGS. 6A to 6G show a part of the policy file 231 and the data structure of FIG. 6G index file 221. The part of the policy file 231 is formed of FIG. 6A copy machine management table 520, FIG. 6B FAX machine management table 521, FIG. 6C scanner management table 522, FIG. 6D gate management table 523, FIG. 6E user management table 530, and FIG. 6F customer management table 531.

The copy machine management table 520 has the table structure formed of 0 or more entries, each of which is a group including the copy machine name, the copy machine location, and the copy sheet.

The FAX machine management table 521 has the table structure formed of 0 or more entries, each of which is a group including the FAX machine name and the FAX machine location.

The scanner management table 522 has the table structure formed of 0 or more entries, each of which is a group including the scanner name and the scanner location.

The gate management table 523 has the table structure formed of 0 or more entries, each of which is a group including the gate name and the gate location.

The user management table 530 has the table structure formed of 0 or more entries, each of which is a group including a user ID, a user name, and a group.

The customer management table 531 has the table structure formed of 0 or more entries, each of which is a group including a customer name and the FAX number.

The policy file 231 is formed of the tables and matrices as described referring to FIGS. 5A to 6G.

The index file 221 has the table structure formed of 0 or more entries, each of which is a group including a document ID, a creator ID, a created date/time, and a label.

FIGS. 7A to 7E show data structures of the respective log files.

A print log file 204 shown in FIG. 7A has the table structure formed of 0 or more entries, each of which is a group including a printed result, printed date/time, a printer user ID, a printer name, a file name, a printed image, a label of a print source, and a print sheet ID.

The copy log file 304 shown in FIG. 7B has the table structure formed of 0 or more entries, each of which is a group including a copy result, copy date/time, copy user ID, a copy machine name, a copy image, a label of a copy source, a copy source sheet ID, and a copy sheet ID.

The FAX transmission log file 314 shown in FIG. 7C has the table structure formed of 0 or more entries, each of which is a group including a FAX transmission result, a transmission date/time, a transmitter ID, a FAX machine name, a FAX number, a transmission image, a label of a transmission source, and a transmission source sheet ID.

The scan log file 324 shown in FIG. 7D has the table structure formed of 0 or more entries, each of which is a group including a scan result, a scan date/time, a scan user ID, a scanner name, a scan image, a label of a scan source, and a scan source sheet ID.

The leave log file 334 shown in FIG. 7E has the table structure formed of 0 or more entries, each of which is a group including a leave result, a leave date/time, a leave user ID, a gate name, a carried-out sheet ID, and a label of the carried-out sheet.

The flowchart and the interface of the embodiment will be mainly described referring to FIGS. 8 to 13 hereinafter.

Figure 8:
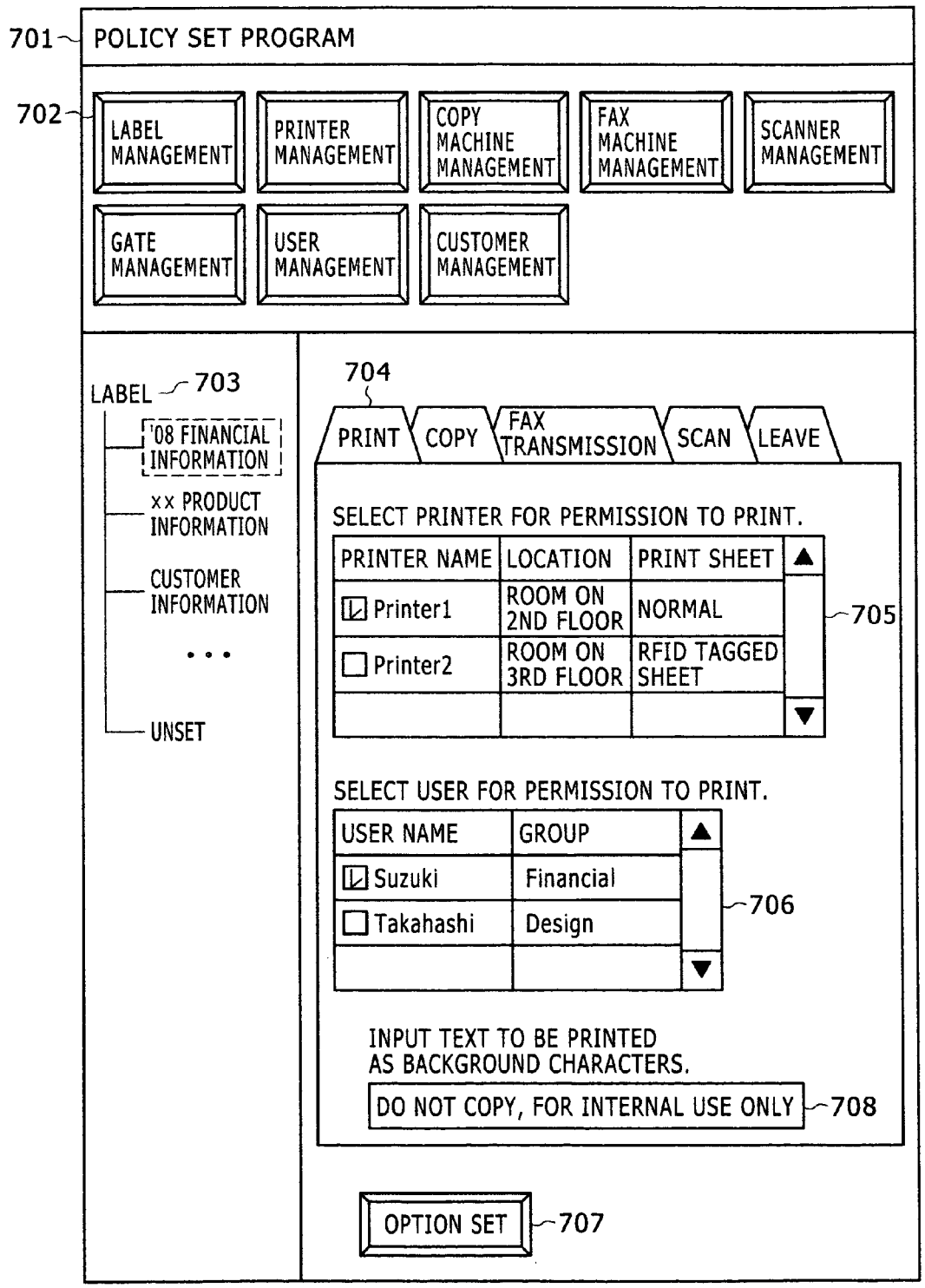
FIG. 8 shows an example of an interface for a policy set program.

FIG. 8 shows an example of an interface 701 of the policy set program 230. Preferably, the interface 701 is designed to execute the access control, for example, user authentication so as to allow only the security manager to activate the program.

The security manager is allowed to open the dialog for addition, correction and deletion of the label with respect to a label management table 501 by depressing a label management button 702. The security manager is also allowed to open the dialog for editing the printer management table 510, the copy machine management table 520, the FAX machine management table 521, the scanner management table 522, the gate management table 523, the user management table 530 or the customer management table 531 corresponding to a printer management button, a copy machine management button, a FAX machine management button, a scanner management button, a gate management button, a user management button, or a customer management button, respectively.

The security manager is capable of confirming the label registered in the label management table 501 on a tree display 703. The user is allowed to edit the policy management matrix 502 and the policy option management matrix 503 on the interface 701 by clicking one label on the tree display 703.

As an example of the interface for editing the policy management matrix 502, the security manager may edit the policy corresponding to the operation by selecting a tab 704 with respect to print, copy, FAX transmission, scan or leave. The security manager is capable of designating the printer permitted to print by simply checking the check box of a printer list box 705. Further, the security manager is capable of designating the user permitted to print by simply checking the check box of a user list box 706. The security manager is capable of designating the string to be embedded as the background by inputting an edit box 708.

The interface as the example for editing the policy option management matrix 503 may be designed to open the dialog for editing upon depression of an option set button 707.

FIG. 9 shows an example of the interface 750 when the user 5 uses the label registration program 220 from the client PC 10. Preferably, the interface 750 is designed to conduct the access control such as user authentication so as to allow only the specific user to activate.

The user 5 drags/drops at least one file for label registration on the interface 750. Upon drag/drop of the file, lists of a file to be registered and an existing label 753 which has already been applied to the file are displayed on a list box 751. The user 5 checks the check box 752 of the file to be registered. The user 5 selects the label to be applied to the checked file from a pull-down menu 754. The pull-down menu 754 displays the list of the labels in the label management table 501. Thereafter, the user 5 depresses a registration button 755 to add the entry to the index file 221 of the document management server 20. The user 5 depresses the cancel button 756 to cancel the label registration.

The work flow which allows the superior of the security manager to approve adequacy of the label selected from the pull down menu 724 may be provided prior to addition of the entry to the index file 221.

Figure 10:
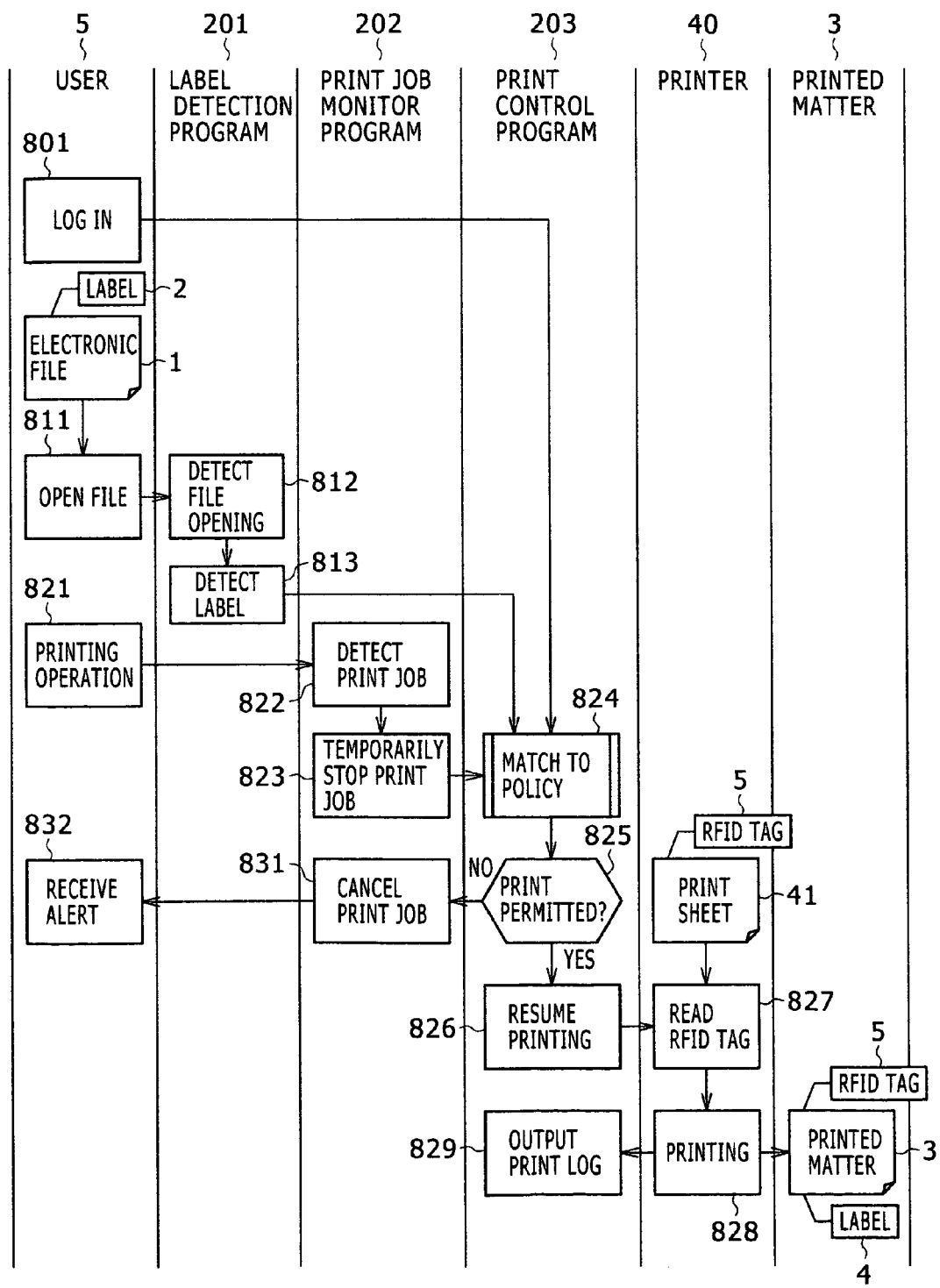
FIG. 10 is a flowchart showing an exemplary printing process.
Figure 11:
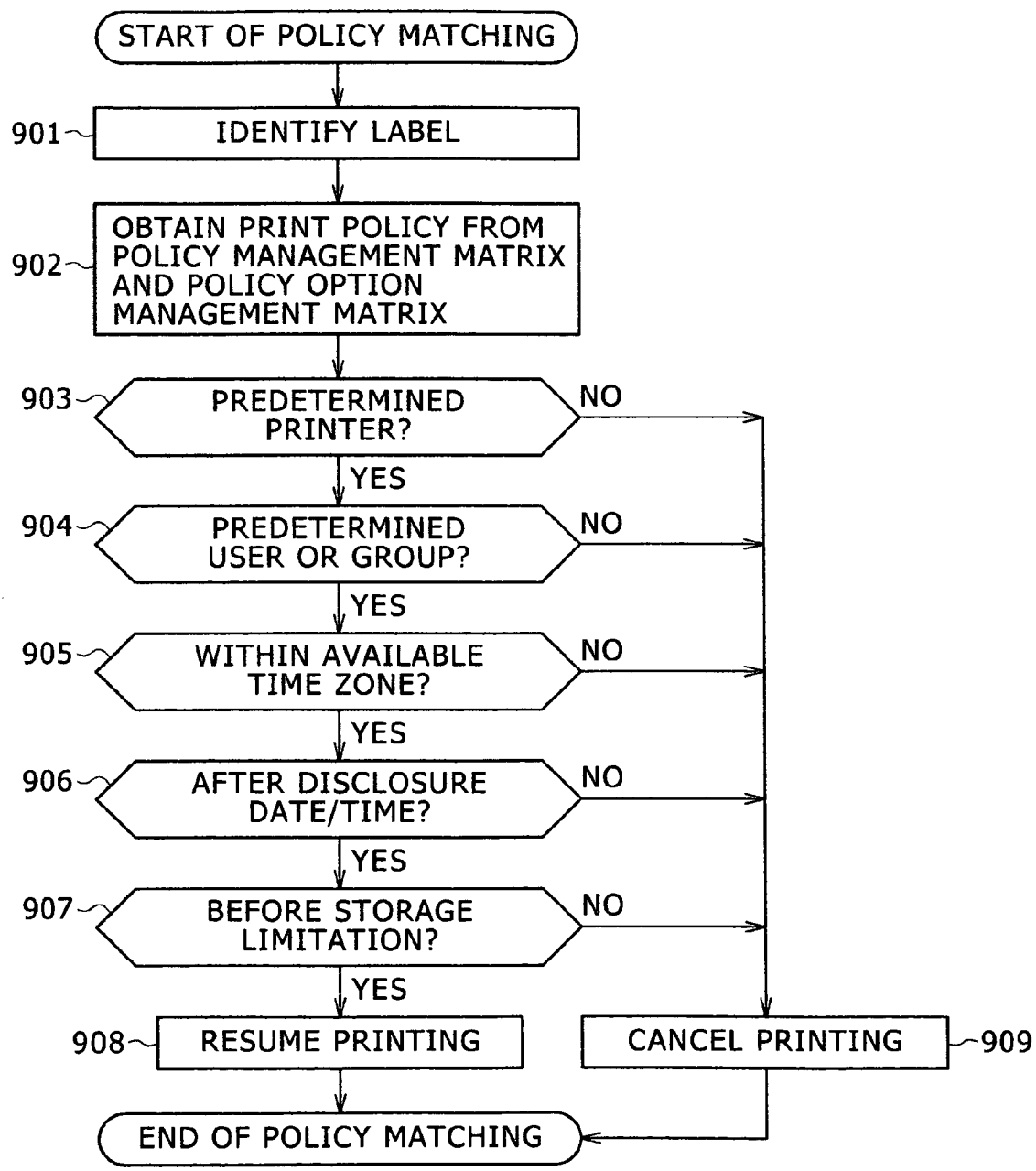
FIG. 11 is a flowchart showing an exemplary policy matching process.

FIG. 10 is a flowchart of the routine of the printing operation executed by the client PC 10.

(step 801) The user 5 operates the client PC 10 for log-in.

(step 811) The user 5 opens the electronic file 1, and further opens the common dialog by double clicking the icon of the file from the explorer or after activating the application program 13. There may be the case where the electronic file 1 has the label 2 already applied.

(step 812) The label detection program 201 detects the file opened on the client PC 10.

(step 813) The label detection program 201 detects the label 2 of the file opened in step 812. If the label 2 cannot be detected, it is determined that the label has been unset, and the process proceeds to step 824. The label 2 contains the identifying information of the opened file.

(step 821) The user 5 allows the application program 13 to print.

(step 822) The print job monitor program 202 detects the print job requested to the OS 12.

(step 823) The print job monitor program 202 temporarily stops the print job. The printing operation is kept interrupted until the print job is resumed.

(step 824) The print control program 203 determines whether the print job is resumed by matching to the policy file 231. The policy matching process in step 824 will be described in detail referring to the flowchart shown in FIG. 11.

(step 901) The label detected in step 813 is received as the label for the print job.

(step 902) The policy management matrix 502 and the policy option management matrix 503 are obtained to have the policy which relates to the printing corresponding to the label identified in step 901.

Communication with the policy management server 30 for each policy matching is not required. The policy management matrix 502 and the policy option management matrix 503 may be stored in the client PC 10.

(step 903) It is determined whether the printer contained in the print job is the predetermined printer set in the policy obtained in step 902.

(step 904) It is determined whether the user contained in the print job is the predetermined user or the group set in the policy obtained in step 902.

(step 905) It is determined whether the printed date/time contained in the print job is within the available time zone set in the policy obtained in step 902.

(step 906) It is determined whether the printed date/time contained in the print job is after the disclosure date/time set in the policy obtained in step 902.

(step 907) It is determined whether the printed date/time contained in the print job is before the storage limit set in the policy obtained in step 902.

(step 908) If Yes is obtained in all the determination results from steps 903 to 907, the instruction to permit the print is issued.

(step 909) If No is obtained in at least one of the determination results from steps 903 to 907, the instruction for inhibiting printing is issued.

The policy matching in step 824 ends by executing the aforementioned process. The printing process will be described referring to FIG. 10.

(step 825) The print control program 203 proceeds to step 826 to be described later if the printing is permitted as the result of matching in step 824, and proceeds to step 831 if the printing is inhibited.

(step 826) The print control program 203 resumes the print job.

The print job may be resumed after changing the print setting of the printer driver 14 by the print control program 203 when needed.

(step 827) The printer 40 reads ID of the RFID tag 5 applied to the print sheet 41.

The process in step 827 may be executed in accordance with the information with respect to the print sheet in the printer management table 510. For example, if the RFID tag is not applied to the sheet, the subsequent printing process may be omitted.

The process in step 827 is not necessarily executed. If the process in step 827 is not executed, the print sheet ID of the print log file 204 is constantly kept blank.

(step 828) The printer 40 executes the printing, and accordingly, the label 4 is applied to the printed matter 3 in accordance with the policy file 231. The label 4 contains the identifying information which has been included in the label 2 applied to the file as the information for identifying the printed matter 3.

(step 829) The print control program 203 outputs the print log to the print log file 204 which contains at least the identifying information contained in the label 4.

(step 831) The print job monitor program 202 cancels the print job, and outputs the print log to the print log file 204.

(step 832) The user 5 is alerted. The alert may be formed by combining the display on the display unit 404, the voice message, the message to the remote via e-mail and the like.

Figure 15:
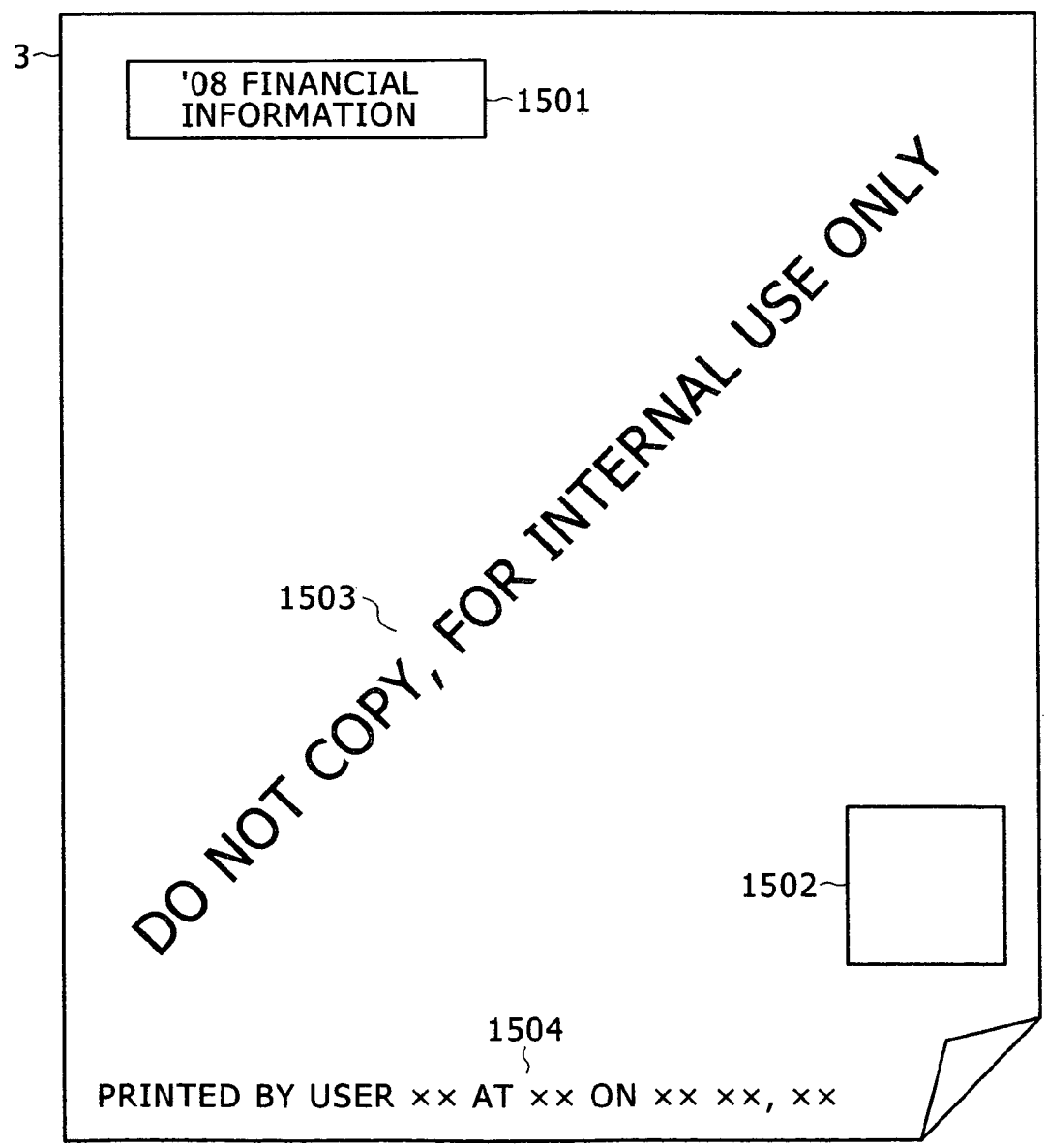
FIG. 15 shows an example of the printed result.

FIG. 15 shows an example of the printed matter 3 to be printed in step 828. The applied label 4 is printed on a margin region 1501 as a visually recognizable string, and as a two-dimensional bar code 1502 which is readable by the MFP 50 and the scanner 80 on the printed matter 3. The background character in accordance with the edit box 708 designated by the policy set program 701 shown in FIG. 8 is printed on the print region 1503. The print related information indicating when the printing is performed by whom is printed on the margin region 1504 as the visually recognizable string.

The label 4 may be printed on the printed matter 3 using the electronic watermark technology.

The label 2 applied to the electronic file 1 is succeeded to the label 4 applied to the printed matter 3 by the printing process of the flowchart as described above. The RFID tag applied to the print sheet, and the label to the file may be identified by referring to the print log file 204.

Figure 12:
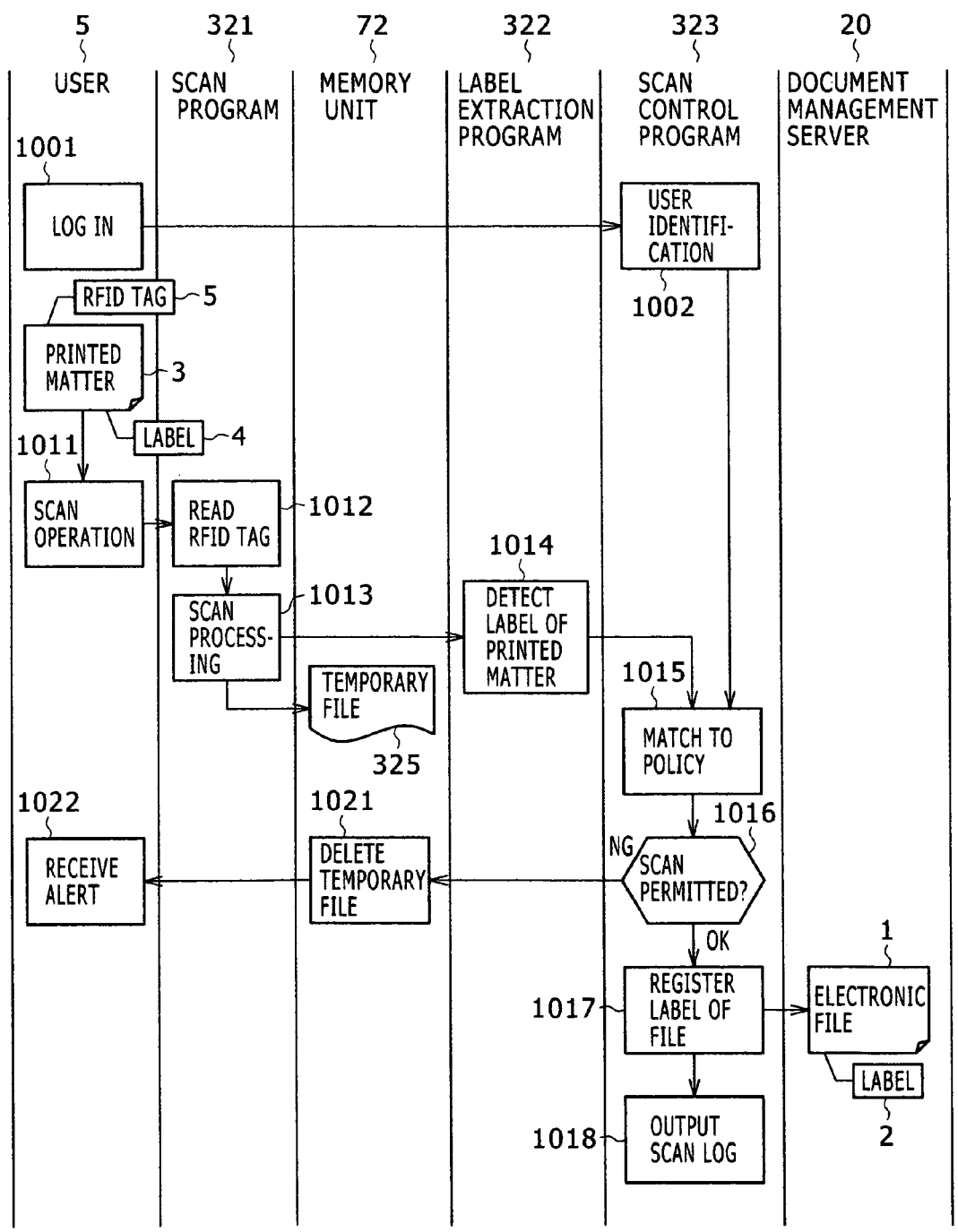
FIG. 12 is a flowchart showing an exemplary scanning process.

FIG. 12 is a flowchart of the scanning process executed by the scanner 80 and the scan server 70.

(step 1001) The user 5 logs in the scan server 70.

(step 1002) The scan control program 323 identifies the user 5.

(step 1011) The user 5 allows the scanner 80 to execute the scan operation of the printed matter 3. There may be the case where the label 4 which contains the identifying information for identifying the printed matter 3, and the RFID tag 5 are applied thereto.

(step 1012) The scan program 321 reads the RFID tag 5 applied to the printed matter 3. The process in step 1012 is not necessarily executed. If the process in the step is not executed, the scan source sheet ID of the scan log file 324 is constantly kept blank.

(step 1013) The scan program 321 scans the printed matter 3 to output a temporary file 325 to the memory unit 72.

(step 1014) The label extraction program 322 analyzes the temporary file 325 to detect the label. For example, it may be structured to read the two-dimensional bar-code contained in the temporary file 325 to extract the label. Alternatively, it may be structured to read the electronic watermark contained in the temporary file 325 to extract the label. The label 4 contains the identifying information for identifying the scanted printed matter 3.

(step 1015) The scan control program 323 executes matching to the policy file 231 to determine as to permission/inhibition of the scanning in accordance with the label. Specifically, the process corresponding to the one in the flowchart for the policy matching shown in FIG. 11 may be executed.

(step 1016) If the scan is permitted as the result of matching in step 1015, the process proceeds to step 1017 to be described later. If the scan is inhibited, the process proceeds to step 1021 to be described later.

(step 1017) The scan control program 323 registers the temporary file 325 in the document management server 20 to register the label 2 which contains the information included in the label 4 detected in step 1014. The user 5 is allowed to designate the file name upon registration in the document management server 20.

(step 1018) The scan control program 323 outputs the scan log to the scan log file 324. The scan log file 324 contains at least the identifying information contained in the label 2.

(step 1021) The scan control program 323 deletes the temporary file 325, and further outputs the scan log to the scan log file 324.

(step 1022) The user 5 is alerted. The alert may be formed by combining the display on the display unit 404, the voice message, the message to the remote via e-mail and the like.

In the flowchart of the scanning process, the label 4 embedded into the printed matter 3 is succeeded by the label 2 applied to the electronic file 1 after the scanning. That is, the identifying information contained in the label 4 for the printed matter 3 is contained in the label 2 for the electronic file 1.

The scan control executed by the scan server 70 has been described referring to FIG. 12. The copy control for the copy machine 50 and the FAX transmission control for the FAX machine 60 may be executed in the similar processing flow.

The process of the copy control is different from the flow in the flowchart shown in FIG. 12 in step 1017 where the copy control program 303 prints the temporary file 325 on the copy sheet 52.

The process of the FAX transmission control is different from the flow in the flowchart shown in FIG. 12 in step 1015 where it is checked as to coincidence of the FAX number set in the policy file 231 with the FAX number input by the user 5. In step 1017, the FAX transmission control program 313 executes the FAX data transmission to the public line 91.

Figure 13:
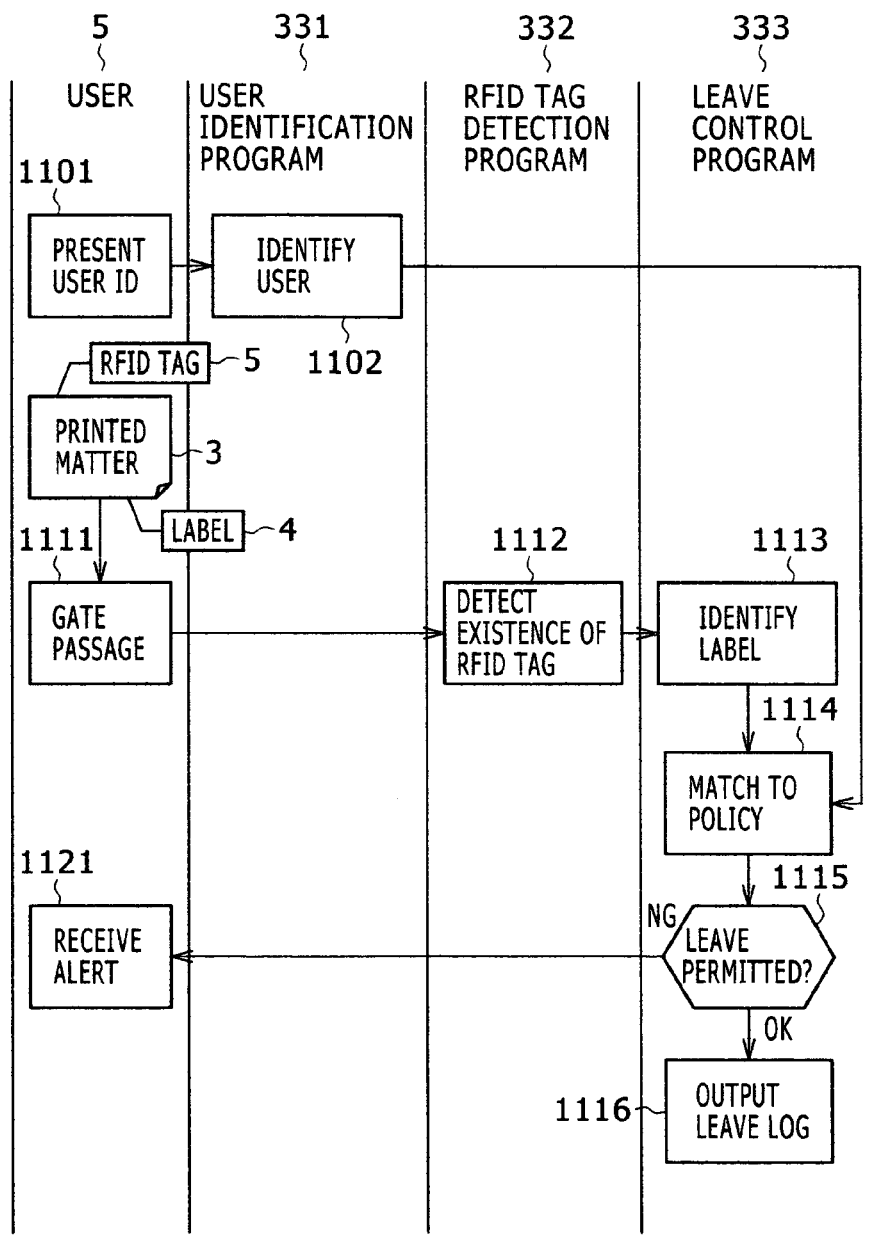
FIG. 13 is a flowchart showing an exemplary leave process.

FIG. 13 shows the flowchart of the operation flow when the user leaves through the gate 93.

(step 1101) The user 5 presents the user ID to the gate 93. The user ID may be presented by inputting the user ID through the key, holding the IC card which stores the user ID over the card reader, or allowing the sensor to read the user's own biometrics.

(step 1102) The user identification program 331 identifies the user 5.

(step 1111) The user 5 passes through the gate. It is assumed that the user 5 carries the printed matter 3.

(step 1112) The RFID tag detection program 332 detects existence of the RFID tag 5 and the ID. Plural RFID tags 5 may be detected.

(step 1113) The leave control program 333 searches the same ID between the print sheet ID of the print log file 204 and the copy sheet ID of the copy log file 304 for identifying the label corresponding to the ID of the RFID tag 5 detected in step 1112.

(step 1114) Based on the label identified in step 1113, the leave control program 333 executes the matching to the policy file 231 to determine permission/inhibition of leave. Specifically, the process corresponding to the one in the flowchart for the policy matching shown in FIG. 11 may be executed.

(step 1115) Based on the result of the process in step 1114, if the leave is permitted, the process proceeds to step 1116. If the leave is inhibited, the process proceeds to step 1121.

(step 1116) The leave control program 333 outputs the leave log to the leave log file 334. The leave log file 334 contains at least the identifying information of the printed matter 3 which is contained in the label 4 identified in step 1113.

(step 1121) The leave control program 333 alerts the user 5 and further outputs the leave log to the leave log file 334. The alert may be output using the patrol lamp in the security room, or the alert may be displayed on the monitor screen of the monitor camera for monitoring the gate. In the above-described flowchart of the operation flow for the leave control, carrying out of the printed matter 3 may be prevented in accordance with the label 4 applied to the printed matter 3.

In the first embodiment, the label applied to the electronic file is embedded into the printed matter so as to be detected upon copying and FAX transmission of the printed matter, scanning of the printed matter into the electronic file, or leave. The control is executed based on the policy in accordance with the label to realize appropriate control of the printed matter in accordance with the content.

Second Embodiment

Figure 14:
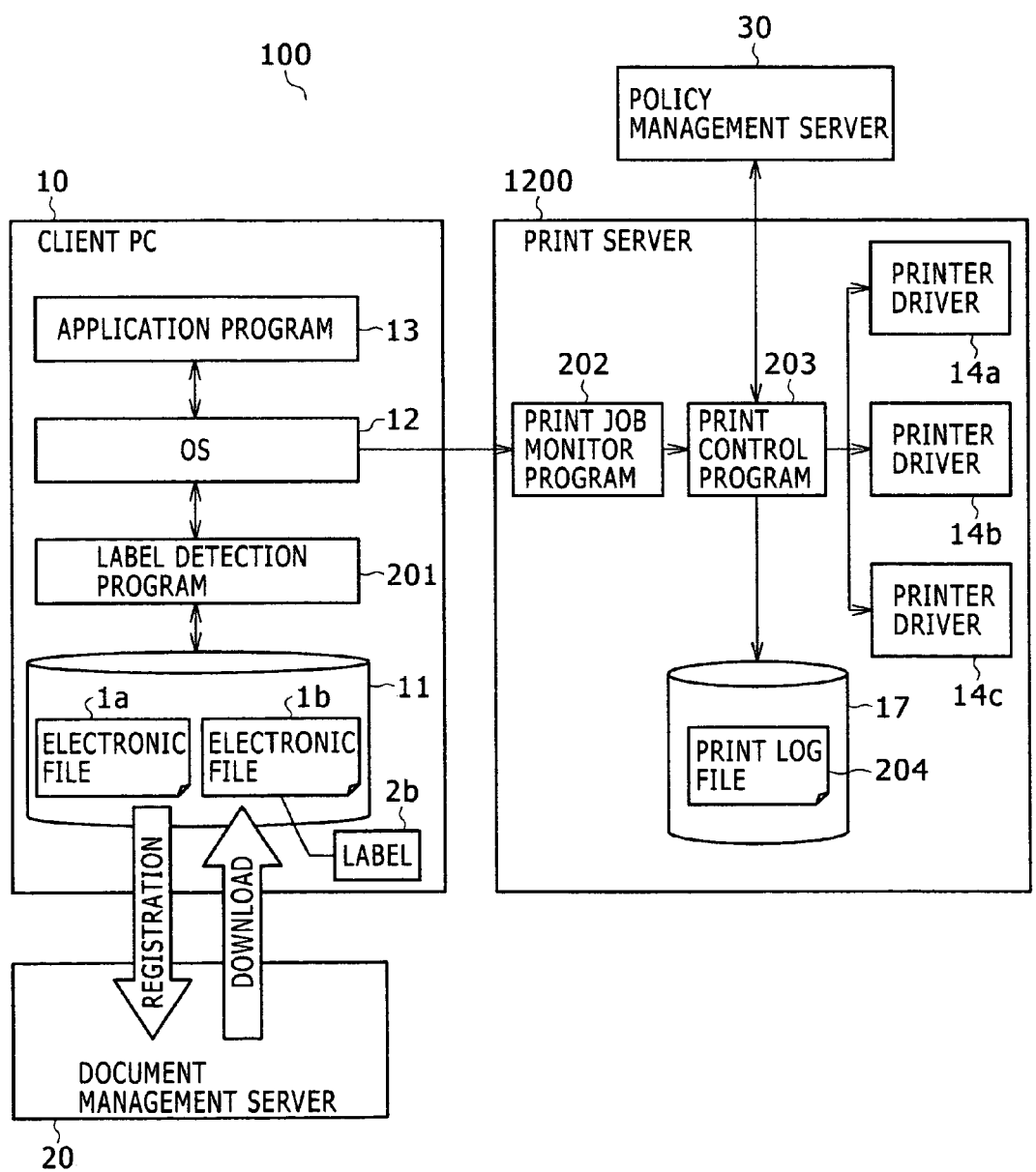
FIG. 14 shows an example of a general structure of a printed matter managing system according to a second embodiment.

A printed matter managing system 100 via the print server according to a second embodiment will be described. When printing via the print server as shown in FIG. 14, the print job from the application program 13 is monitored by the print job monitor program 202 on a print server 1200, and the print job is matched to the policy file 231 by the print control program 203 for controlling the printing operation.

In the second embodiment, the label may be embedded in the printed matter by installing the printer driver in the print server 1200 without the need of installing the respective printer drivers in the client PC 10.

Third Embodiment

A printed matter managing system 100 according to a third embodiment applies the label by detecting the file contents even if the label is not applied to the file. The insertion of the electronic watermark will be described as the example for applying the label to the printed matter.

Figure 16:
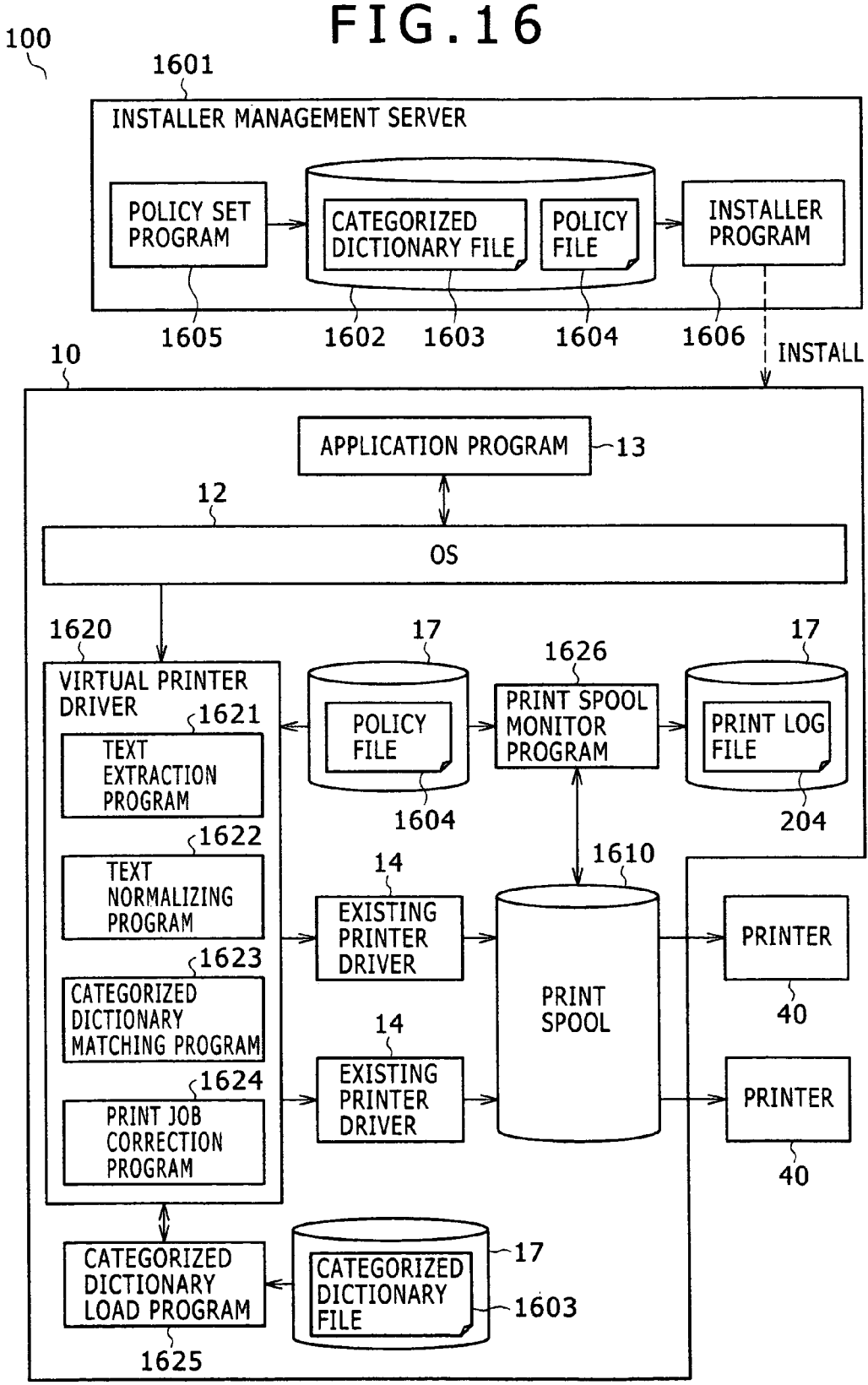
FIG. 16 is a block diagram showing a printed matter managing system according to a third embodiment.

The printed matter managing system 100 shown in FIG. 16 is formed of an installer management server 1601, the client PC 10, and the printer 40.

The installer management server 1601 includes a memory unit 1602 for storing a categorized dictionary file 1603 and a policy file 1604. A policy set program 1605 includes the interface for editing the categorized dictionary file 1603 and the policy file 1604, and generates an installer program 1606 based on the command from the interface. The installer program 1606 is copied by the client PC 10 via the network and the portable medium. The required program is installed in the client PC 10 by executing the installer program 1606.

The client PC 10 includes the memory unit 17 for storing the categorized dictionary file 1603, the policy file 1604, and the print log file 204. The application program 13, the OS 12, and the existing printer driver 14 are the same as those described in the first embodiment. The OS 12 includes a print spool 1610. When the printing operation is executed by the application program 13, the print job is accumulated in the print spool 1610 for transmitting the print job to the printer 40 so as to perform the printing operation.

Upon execution of the installer program 1606, a virtual printer driver 1620, a categorized dictionary load program 1625, a print spool program 1626, the categorized dictionary file 1603, the policy file 1604 are copied in the client PC 10. The OS 12 is modified to allow the print spool monitor program 1626 to be resident.

The virtual printer driver 1620 similar to the existing printer driver 14 includes a text extraction program 1621, a text normalizing program 1622, a categorized dictionary matching program 1623, and a print job correction program 1624. The virtual printer driver 1620 is operated in cooperation with the categorized dictionary load program 1625.

FIG. 17 shows an exemplary data structure of the categorized dictionary file 1603. The categorized dictionary file 1603 includes plural categorized files from 1701 to 1712. The categorized file 1701 is a text file with a file name of "last name". The categorized file 1701 contains plural rows, each corresponding to one word. Likewise, categorized files 1702, 1703, 1704, 1705, 1706, 1707, 1708, 1709, 1710, 1711, and 1712 have file names of "first name_male", "first name_female", "place name", "contract document", "financial statement", "organization name", "C language", "JAVA™ language", "zip code", "phone number", and "mail address", respectively.

In the categorized files 1710 and 1711, the respective expressions of the zip codes and the phone numbers are simplified using regular expression.

The categorized dictionary file 1603 may be of any other type without being limited to the type with the aforementioned categorized file.

FIG. 18 shows an example of the interface of the policy set program 1605. The policy set program includes a button 1801 for editing business information list, a button 1802 for editing categorized dictionary, a button 1803 for creating installer, a business information list pane 1810, a business information set pane 1820, and a print policy pane 1830 upon matching of the business information.

Upon depression of the button 1801 for editing business information list, a tree view of the defined business information list is displayed on the business information list pane 1810. Clicking of the last end of the tree displays the pane 1820 for defining the business information and the print policy pane 1830, which relate to the corresponding business information.

Upon depression of the button 1802 for editing the categorized dictionary, the list of the defined categorized dictionaries is displayed on the business information list pane 1820. The check box 1821 of the list is checked, and a threshold value 1822 is further input to define the business information. If the respective values of all the categories with the check box 1821 exceed the corresponding threshold values 1822, the business information is regarded as the identifying information contained in the label (electronic watermark) to be applied to the printed matter. The business information as the identifying information may include the personal information, financial information and the like as shown in FIG. 18.

On the print policy pane 1830 when matching the business information, each policy of the electronic watermark, date/time, output target, color, alert, and log is defined, respectively. For example, the electronic watermark may be defined by checking either button 1831 for "apply" or "not apply".

Permission of the electronic watermarking is defined by checking the check box 1832. The information for inserting the electronic watermark in the printed matter is defined by depressing the button 1833 for setting the watermark information.

Designation of the target printer intended to output may be performed by individually designating the printer, or by collectively designating the printers in the same segment as the client PC 10.

Upon depression of the installer creation button 1803, the installer program 1606 with the policy defined on the installer management server 1601 is created.

The block structure and the data structure of the printed matter managing system 100 according to the third embodiment have been described. Then the flow of the processing performed in the printed matter managing system 100 will be described.

FIG. 19 is a flowchart of the operation flow of the virtual printer driver 1620.

(step 1901) The categorized dictionary load program 1625 called from the virtual printer driver 1620 reads the categorized dictionary file 1603.

(step 1902) Upon reading of the categorized file 1710 indicating the zip code and the categorized file 1711 indicating the phone number among those of the categorized files, the categorized dictionary load program 1625 expands the simply expressed word with the regular expression. For example, the expression of "060-00{00-63}" is expanded into plural words of "060-0000", "060-0001", "060-0002" . . . "060-0063".

(step 1903) The categorized dictionary load program 1625 reads the threshold value from the policy file 1604.

(step 1911) The virtual printer driver 1620 receives the print job from the application program 13.

(step 1912) The text extraction program 1621 obtains the print size from the print job.

(step 1913) The text extraction program 1621 extracts the text information contained in the print job. The text information may be extracted by processing through OutputChartStr method of the printer driver equipped with Printer control language.

(step 1914) The text extraction program 1621 determines whether or not the text information obtained in step 1913 has the size excessively smaller than the print size obtained in step 1912. For example, in the case of the text file that contains the multi-bite character code, the number of characters is assumed to be equal to or more than half the bite number of the file size. If the number of characters of the text information obtained in step 1913 is equal to or smaller than quarter of the file size, it may be determined that the text information size is too small.

(step 1915) If it is determined that the text information size is too small in step 1914, the text extraction program 1621 executes the OCR (Optical Character Reader) process to extract the text information.

(step 1921) The text normalizing program 1622 executes normalization with respect to the text information extracted in step 1913 or 1915. If there is a line break in the middle of the text information, it is difficult to determine whether such line break is intentionally made or forcibly made at the right end automatically. Accordingly, the process for filling the space is executed. The blank added for keeping up the appearance after the printing operation is filled in the text extraction process.

(step 1931) The categorized dictionary matching program 1623 determines with respect to the language used for the normalized text information.

(step 1932) In accordance with the used language determined in step 1931, the categorized dictionary matching program 1623 divides the text information normalized in step 1921 into parts of speech through the morphological analysis.

(step 1933) The categorized dictionary matching program 1623 executes matching to the categorized dictionary file 1603. The matching will be described in detail referring to FIG. 20 subsequently.

(step 1934) The categorized dictionary matching program 1623 determines whether any business information matches. The matched business information is the identifying information contained in the label to be applied to the printed matter.

(step 1935) If any one of the business information matches, the categorized dictionary matching program 1623 refers to the policy file 1604 to determine as to the policy for applying the electronic watermark.

(step 1936) The categorized dictionary matching program 1623 refers to the policy file 1604 to determine as to the policy for permitting the exception.

Figure 21A:
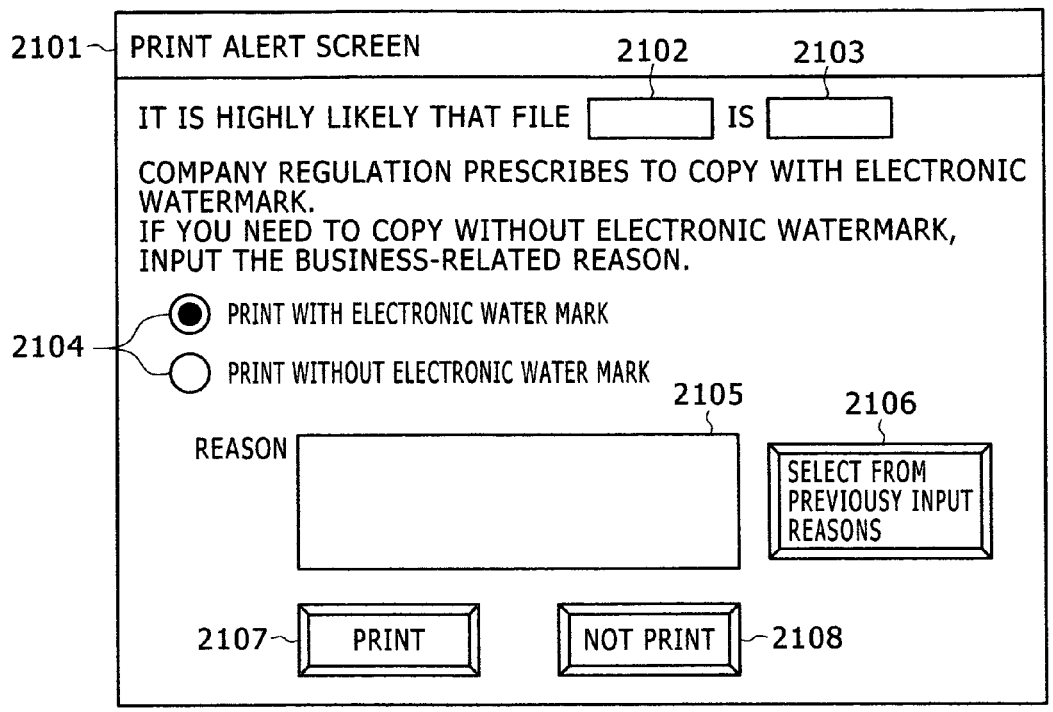
FIGS. 21A and 21B show an example of an interface for inquiry to the user about the exceptional process.

(step 1937) If the policy for permitting the exception exists, the categorized dictionary matching program 1623 displays the dialog for inquiring the user. An example of the dialog is shown in FIG. 21A.

The screen of the dialog 2101 includes a text box 2102 indicating the name of the file to be printed, a text box 2103 indicating the corresponding business information, a radio button 2104 for allowing the user to determine as to insertion of the electronic watermark, a text box 2105 for inputting the reason for printing without inserting the electronic watermark, a button 2106 which allows the user to select the reasons previously input, a button 2107 for printing, and a button 2108 for canceling the printing.

(step 1938) Upon depression of the button 2107 for printing on the dialog 2101, the process proceeds to step 1941. Upon depression of the button 2108 for cancelling the printing, the process proceeds to step 1942.

(step 1941) The print job correction program 1624 inserts the electronic watermark into the print job. The electronic watermark as the label contains not only the business information as the identifying information for identifying the printed matter but also the information to be inserted into the printed matter which has been defined by the policy set program 1605, if any, in response to depression of the watermark information set button 1833.

(step 1942) The print job correction program 1624 sets the value as the print job attribute. An example of the data structure of the print job attribute is shown in FIG. 22.

The print job attribute is formed of a printer driver common area 2201 required to be provided commonly as the printer driver and a printer driver inherent area 2202 allowed to be provided for each printer driver. A text extraction result 2211, a business information type 2212, a total score 2213, existence of the electronic watermark 2214, the reason for printing without the watermark 2215, the availability of printing 2216, and the check sum 2217 are set in the printer driver inherent area 2202. The check sum 2217 is set to the default as the initial setting.

Figure 22:
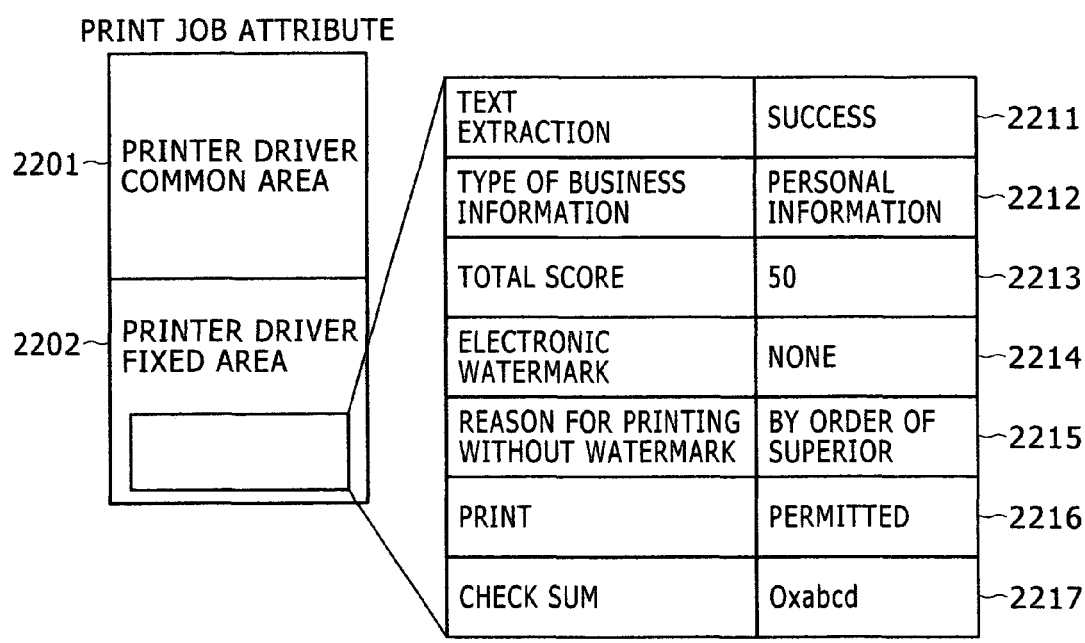
FIG. 22 shows an example of a data structure of a print job attribute.

The data structure shown in FIG. 22 is a mere example, and may include data other than that shown in FIG. 22.

(step 1943) The print job correction program 1624 calculates the check sum of the print job attribute, and sets the value to the check sum 2217.

(step 1944) The virtual printer driver 1620 calls the existing printer driver 14.

In the aforementioned process, the virtual printer driver 1620 is allowed to execute the print control for limiting the printing operation in accordance with the print content, and inserting the required electronic watermark.

FIG. 20 specifically shows an example of the process executed by the virtual printer driver 1620.

The example will be described in the case where the virtual printer driver 1620 receives the print job formed of the document and table shown in a print image 2001 from the application program 13.

The text extraction program 1621 extracts the text shown as the text information 2002 from the print job. In the above case, it is difficult to distinguish the intentional line break from the one automatically made at the right end.

The text normalizing program 1622 fills the space of the blank and line break. The categorized dictionary matching program 1623 categorizes the normalized text information into parts of speech to obtain such categorized results as the morphological analysis result 2003.

The categorized dictionary matching program 1623 matches to the categorized dictionary file 1603. For example, when matching to the "organization name" of the categorized file 1707, the number of words fully matched to the morphological analysis result 2003 is obtained as shown in a matching result 2004. The string and the number of the strings (score) which are partially matched to the morphological analysis result 2003 are obtained. The minimum score among those of the partially matched strings is set as the score as the partial match. Then, the value derived from adding the partial match score to the fully match score is set as the word score.

The categorized dictionary matching program 1623 makes the comparison with the threshold value. If the total word score is equal to or larger than the threshold value, it is determined that the subject text is the business information as the identifying information of the printed matter.

The aforementioned process ensures to allow the string matching to the text contained in the print job without missing the text owing to the line break, automatic return and blank space.

Figure 23:
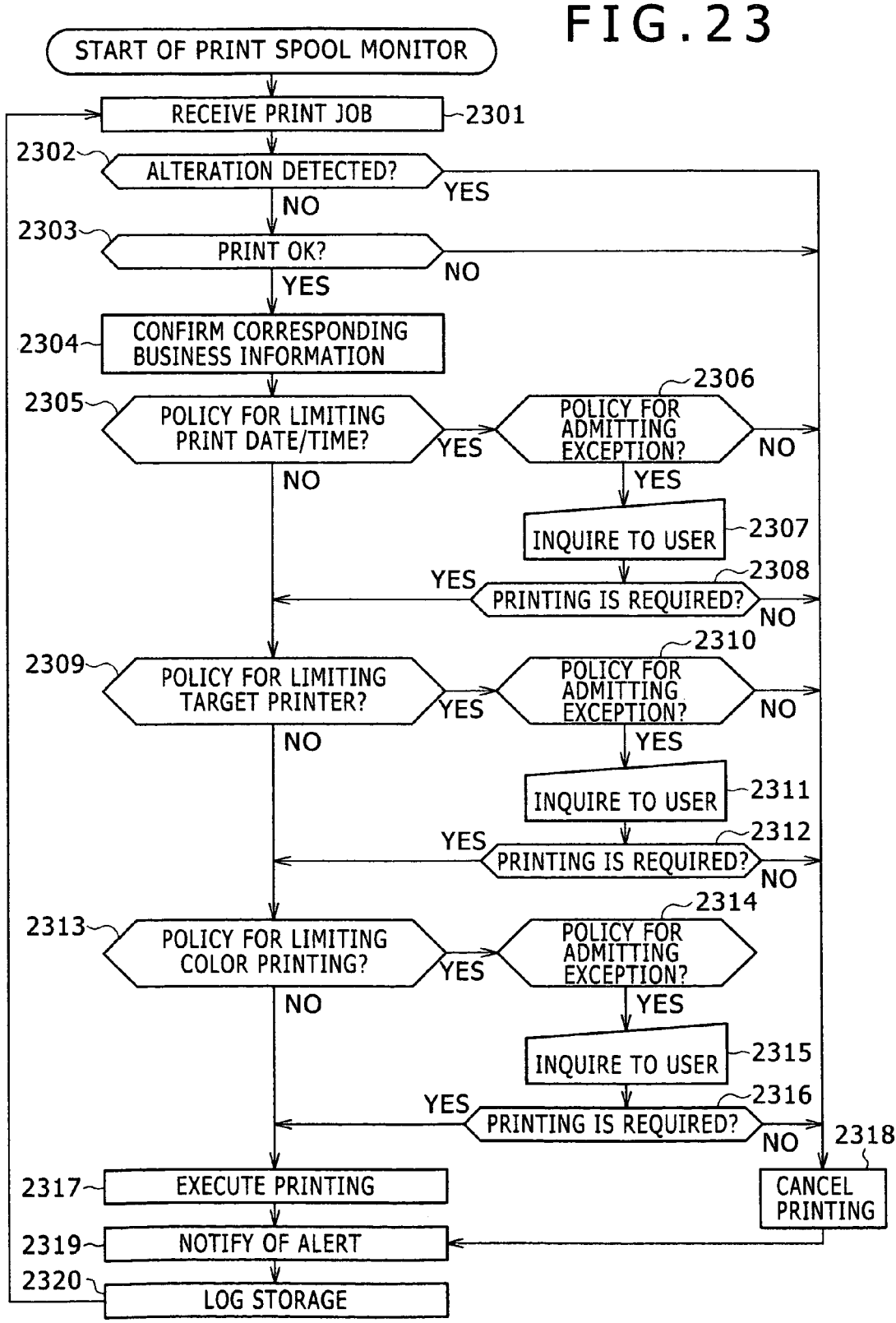
FIG. 23 is a flowchart showing an exemplary operation executed by a print spool monitor program.

FIG. 23 is a flowchart showing an exemplary operation flow of the print spool monitor program 1626.

(step 2301) The print spool monitor program 1626 receives the print job while monitoring the print job to be accumulated in the print spool 1610.

(step 2302) The print spool monitor program 1626 calculates the check sum of the received print job again, and matches to the check sum 2217 of the print job attribute so as to confirm with respect to possibility of alteration to the print job attribute.

(step 2303) The print spool monitor program 1626 confirms whether the printing is inhibited in reference to availability of the printing operation 2216.

(step 2304) The print spool monitor program 1626 identifies the business information in reference to the business information type 2212.

(step 2305) The print spool monitor program 1626 determines with respect to limitation of the printed date/time in reference to the policy file 1604.

(step 2306) The print spool monitor program 1626 determines whether the policy permits the exception in reference to the policy file 1604.

Figure 21B:
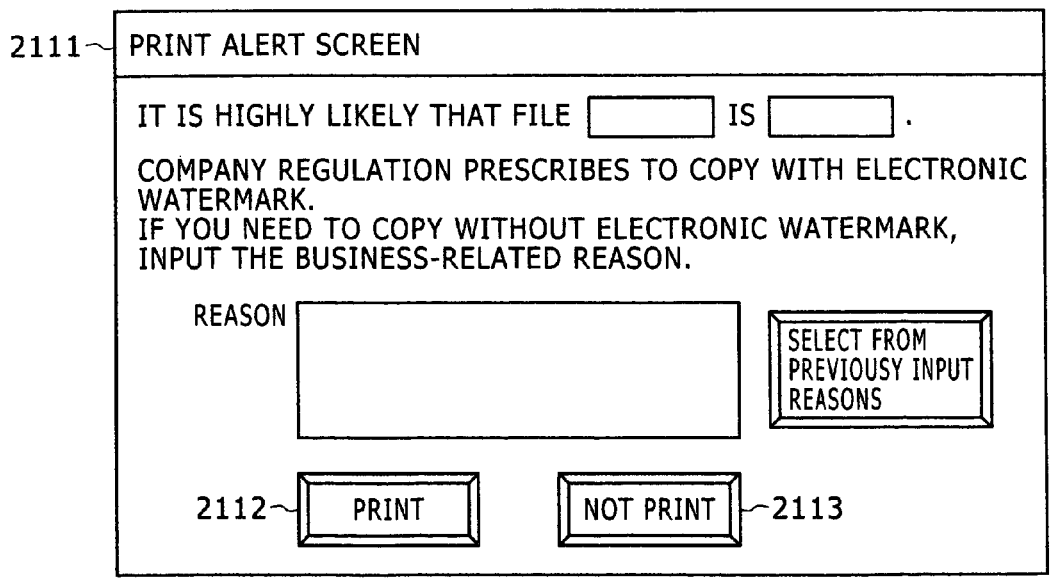

(step 2307) The print spool monitor program 1626 displays the dialog for inquiring the user whether the printing is performed as the exceptional case. An example of the dialog is shown as a dialog 2111 in FIG. 21B. The user is expected to instruct to print by pressing the button 2112, or to cancel the print by pressing the button 2113.

(step 2308) The print spool monitor program 1626 determines as to execution of the printing from the command of the user.

In steps from (step 2309) to (step 2316), the process for limiting the target printer for output reception and the color printing may be executed in steps corresponding to the flow from (step 2305) to (step 2308).

(step 2317) The print spool monitor program 1626 executes the printing.

(step 2318) The print spool monitor program 1626 cancels the printing.

(step 2319) The print spool monitor program 1626 notifies of the alert as needed in the predetermined method in reference to the policy file 1604.

(step 2320) The print spool monitor program 1626 outputs to the print log file 204 as needed in reference to the policy file 1604. The print log file 204 contains at least extracted business information as the identifying information of the printed matter.

The aforementioned process allows the printing control to apply the appropriate label to the printed matter in accordance with the print content even when no label is applied to the electronic file.

In the third embodiment, in the state where the label is not applied to the electronic file, the printing control for appropriately inhibiting the printing in accordance with the content, or forcibly printing by applying the appropriate label can be realized by thoroughly checking the print content. The print control is executed in accordance with the policy to allow the user to determine execution of the printing control after inquiring the user with respect to the reason. This makes it possible to prevent the business trouble caused by the excessive print limitation.

The aforementioned embodiments provide the printed matter managing system for controlling the security management of the printed matter in accordance with the content without leaving the security management of the printed matter to the user.

With the control result output as the log, the operation applied to the printed matter or confirmation with respect to existence of the printed matter may be easily performed as a result of limiting any one of the use of the read result by the computer and the physical carrying out of the printed matter.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A printed matter managing system configured to print a file to which a label in accordance with identifying information of the file is applied and to manage the printed file as a printed matter, comprising:
   a detection unit configured to detect the label applied to the printed matter in one of (i) reading the printed matter by a computer and (ii) physically carrying out the printed matter from a predetermined region;
   a limiting unit configured to limit one of
   (A) a result from at least one (i) the reading of the printed matter by the computer and (ii) the physically carrying out of the printed matter, and
   (B) the identifying information contained in the detected label;
   a policy management unit configured to manage a policy with respect to printing of the file;
   a print control unit configured to control the printing of the file based on a control content to print the label, limit an available printer, limit a type of an available print sheet, print information which relates to the printing, and inhibit the printing in accordance with the identifying information of the file in reference to the policy with respect to the printing managed by the policy management unit, and
   a log output unit configured to output a control result of the printing to a print log;
   wherein the print control unit is configured to
      inquire a user about the control content in accordance with the identifying information of the file, and
      display a screen which allows the user to input a reason for printing based on a content other than the control content.

2. The printed matter managing system according to claim 1, further comprising a file management unit configured to manage the identifying information of the file,
   wherein the identifying information referenced by the print control unit contains one of (i) information applied to the file managed by the file management unit and (ii) information based on a content of the file.

3. The printed matter managing system according to claim 2, wherein the information based on the content of the file is matched to a predetermined dictionary for extracting the identifying information with respect to full matching and partial matching of a word contained in the content.

4. The printed matter managing system according to claim 1, wherein the result from the reading of the printed matter of the limiting unit is copied by printing, the system further comprising:
   a policy management unit configured to manage a copy policy;
   a copy control unit configured to control the copy of the result from the reading of the printed matter based on any one of limiting an available copy machine, limiting a type of an available copy sheet, and inhibiting the copy in accordance with information contained in the label detected by the detection unit in reference to the copy policy managed by the policy management unit; and
   a log output unit configured to output a result of the copy control to a copy log.

5. The printed matter managing system according to claim 4,
   wherein the policy management unit is configured to define the copy policy when the label is unset; and
   the copy control unit is configured to control the copy by printing the result from the reading of the printed matter in accordance with the copy policy when the label is unset, which is defined by the policy management unit when the detection unit is incapable of detecting the label.

6. The printed matter managing system according to claim 1, wherein the result from the reading of the printed matter of the limiting unit is scanned to be stored in a memory, the system further comprising:
   a policy management unit configured to manage a scan policy;
   a scan control unit configured to control the scan of the read result based on any one of limiting an available scanner, applying a label which contains the same information data as that contained in the label to the file as the scan result to be stored in the memory, and inhibiting the scan in accordance with the information contained in the label detected by the detection unit in reference to the scan policy managed by the policy management unit; and a log output unit configured to output a result of the scan control to a scan log.

7. The printed matter managing system according to claim 6,
wherein the policy management unit is configured to define the scan policy of the scan when the label is unset; and
the scan control unit is configured to control the scan of the result from the reading of the printed matter in accordance with the scan policy when the label is unset, which is defined by the policy management unit when the detection unit is incapable of detecting the label.

8. The printed matter managing system according to claim 1, further comprising:
a policy management unit configured to manage a leave policy with respect to the carrying out from the predetermined region while physically carrying out the printed matter;
a leave control unit configured to control a leave based on one of (i) limiting an available gate which allows the leave and (ii) outputting an alert in accordance with information contained in the label detected by the detection unit in reference to the leave policy managed by the policy management unit; and
a log output unit for outputting a result of the leave control to a leave log.

9. The printed matter managing system according to claim 8, wherein the policy management unit is configured to define the leave policy when the label is unset; and
the leave control unit is configured to control the carrying out in accordance with the leave policy when the label is unset, which is defined by the policy management unit when the detection unit is incapable of detecting the label.

10. The printed matter managing system according to claim 1, wherein the result from the reading of the printed matter of the limiting unit is subjected to FAX transmission, the system further comprising:
a policy management unit configured to manage a FAX transmission policy;
a FAX transmission control unit configured to control the FAX transmission of the result from the reading of the printed matter based on any one of limiting an available FAX machine, limiting an available addressee of the FAX transmission, and inhibiting the FAX transmission in accordance with information contained in the label detected by the detection unit in reference to the FAX transmission policy managed by the policy management unit; and
a log output unit configured to output a result of the FAX transmission control to a FAX transmission log.

11. The printed matter managing system according to claim 10,
wherein the policy management unit is configured to define the FAX transmission policy when the label is unset; and
the FAX transmission control unit is configured to control the FAX transmission of the result from the reading of the printed matter in accordance with the FAX transmission policy when the label is unset, which is defined by the policy management unit when the detection unit is incapable of detecting the label.

12. A printed matter managing system configured to print a file to which a label in accordance with identifying information of the file is applied and to manage the printed file as a printed matter, comprising:
a detection unit configured to detect the label applied to the printed matter in one of (i) reading the printed matter by a computer and (ii) physically carrying out the printed matter from a predetermined region;
a limiting unit configured to limit one of
(A) a result from at least one of (i) the reading of the printed matter by the computer and (ii) the physically carrying out of the printed matter, and
(B) the identifying information contained in the detected label;
a policy management unit configured to manage a policy with respect to printing of the file;
a policy management unit configured to manage a leave policy with respect to the carrying out from the predetermined region while physically carrying out the printed matter;
a leave control unit configured to control a leave based on one of (i) limiting an available gate which allows the leave and (ii) outputting an alert in accordance with information contained in the label detected by the detection unit in reference to the leave policy managed by the policy management unit; and
a log output unit for outputting a result of the leave control to a leave log,
wherein
the policy management unit is configured to define the leave policy when the label is unset; and
the leave control unit is configured to control the carrying out in accordance with the leave policy when the label is unset, which is defined by the policy management unit when the detection unit is incapable of detecting the label.

13. A printed matter managing method for printing a file to which a label in accordance with identifying information of the file is applied and managing the printed file as a printed matter, by using a printed matter managing apparatus, the method comprising the steps of:
a detection step of detecting the label applied to the printed matter in one of (i) reading the printed matter by a computer and (ii) physically carrying out the printed matter from a predetermined region;
a limiting step of limiting one of
(A) a result from (i) the reading of the printed matter by the computer and (ii) the physically carrying out of the printed matter, and
(B) the identifying information contained in the detected label;
a policy management step of managing a leave policy with respect to the carrying out from the predetermined region while physically carrying out the printed matter;
a leave control step of controlling a leave based on one of (i) limiting an available gate which allows the leave and (ii) outputting an alert in accordance with information contained in the label detected in the detection step in reference to the leave policy in the policy management step; and
a log output step of outputting a result of the leave control to a leave log,
wherein in the policy management step, the leave policy is defined when the label is unset; and
in the leave control step, the physically carrying out is controlled in accordance with the leave policy when the label is unset, which is defined in the policy management step when the detection unit is incapable of detecting the label.

\* \* \* \* \*